(12) United States Patent
Iwasaki

(10) Patent No.: US 7,440,119 B2
(45) Date of Patent: Oct. 21, 2008

(54) THREE-DIMENSIONAL SHAPE DETECTING DEVICE, IMAGE CAPTURING DEVICE, AND THREE-DIMENSIONAL SHAPE DETECTING METHOD

(75) Inventor: Takeo Iwasaki, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 215 days.

(21) Appl. No.: 11/296,347

(22) Filed: Dec. 8, 2005

(65) Prior Publication Data

US 2006/0152738 A1 Jul. 13, 2006

Related U.S. Application Data

(63) Continuation-in-part of application No. PCT/JP2004/010298, filed on Jul. 20, 2004.

(30) Foreign Application Priority Data

Jul. 23, 2003 (JP) ............................. 2003-278410
Jul. 23, 2003 (JP) ............................. 2003-278411

(51) Int. Cl.
*G01B 11/24* (2006.01)
(52) U.S. Cl. .................... 356/602; 356/605; 356/606; 356/607; 356/608
(58) Field of Classification Search ......... 356/601–614, 356/621–625, 635–636, 640; 250/237 G
See application file for complete search history.

(56) References Cited

U.S. PATENT DOCUMENTS 5,307,151 A * 4/1994 Hof et al. .................. 356/604
5,636,025 A * 6/1997 Bieman et al. ............. 356/619
5,668,631 A * 9/1997 Norita et al. .............. 356/608
5,825,495 A * 10/1998 Huber ....................... 356/600
6,291,817 B1 * 9/2001 Kobayashi et al. ........ 250/237 G
6,483,536 B2 * 11/2002 Aoyama .................... 348/139
6,553,138 B2 * 4/2003 Rozin ....................... 382/154
6,738,516 B1 * 5/2004 Kondo et al. .............. 382/190
6,765,684 B2 * 7/2004 Imaizumi .................. 356/605
6,873,421 B2 * 3/2005 Lim et al. .................. 356/605
7,061,628 B2 * 6/2006 Franke et al. .............. 356/604
7,092,563 B2 * 8/2006 Shiratani .................. 382/154

FOREIGN PATENT DOCUMENTS

JP   A 07-318315    12/1995
JP   B2 08-27176    3/1996
JP   A 2001-309132  11/2001

* cited by examiner

*Primary Examiner*—Sang Nguyen
(74) *Attorney, Agent, or Firm*—Oliff & Berridge, PLC

(57) ABSTRACT

There is provided a three-dimensional shape detecting device comprising: pattern beam projection means which projects a plurality of pattern beams including two pattern beams having different angular widths; image capturing means which captures an image of a subject onto which the pattern beams are projected, from a position a prescribed distance apart from the pattern beam projection means; and three-dimensional shape calculation means which calculates positions of the pattern beams projected on the subject based on the image captured by the image capturing means and thereby determines a three-dimensional shape of the subject.

17 Claims, 23 Drawing Sheets

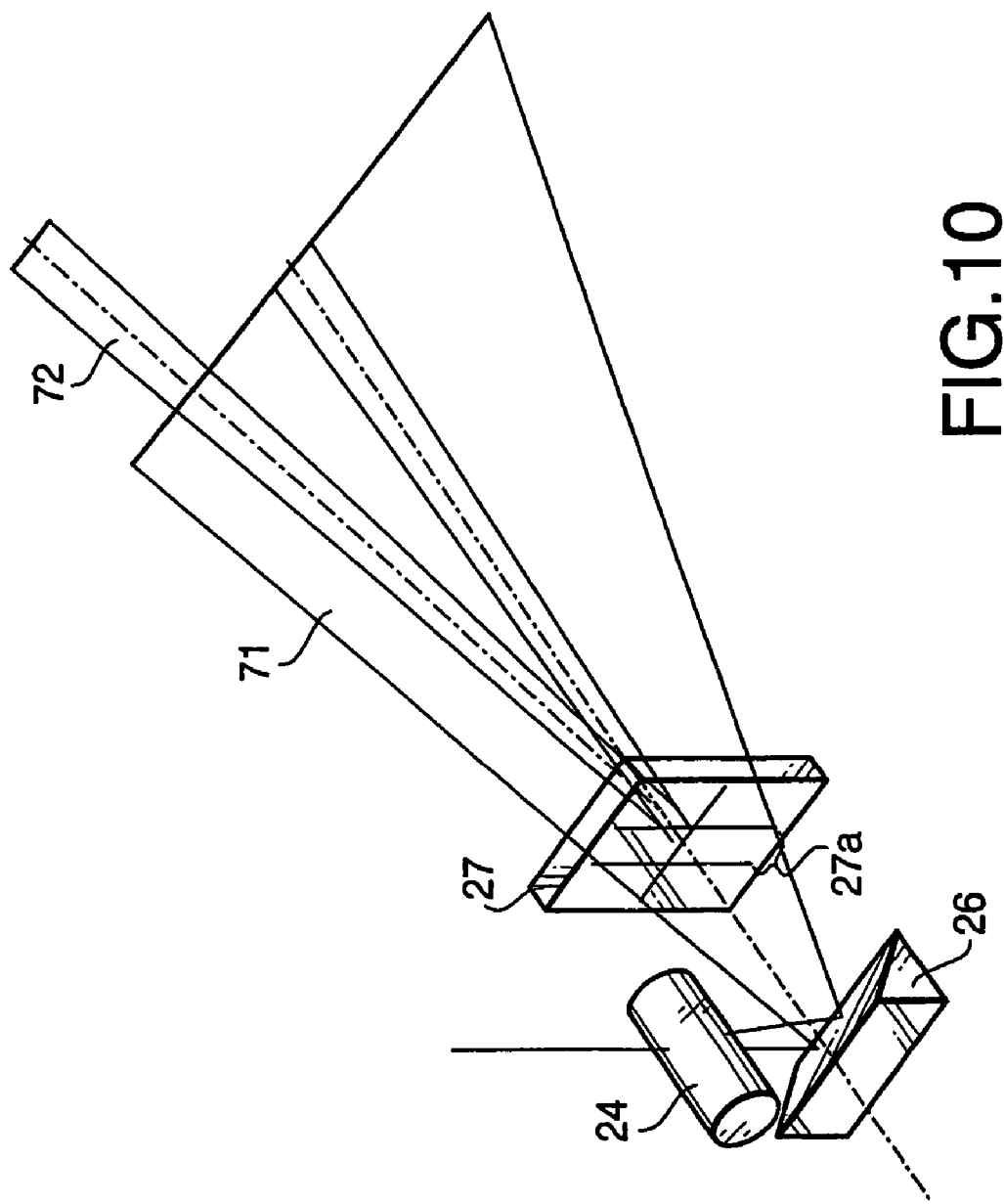

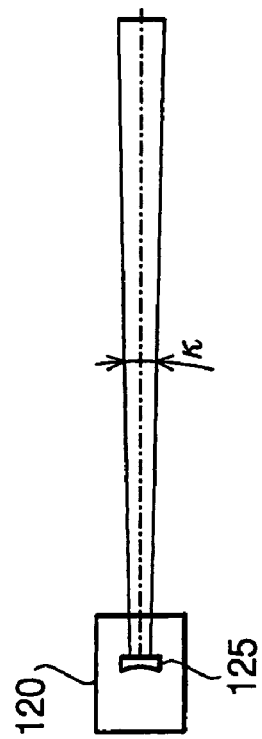
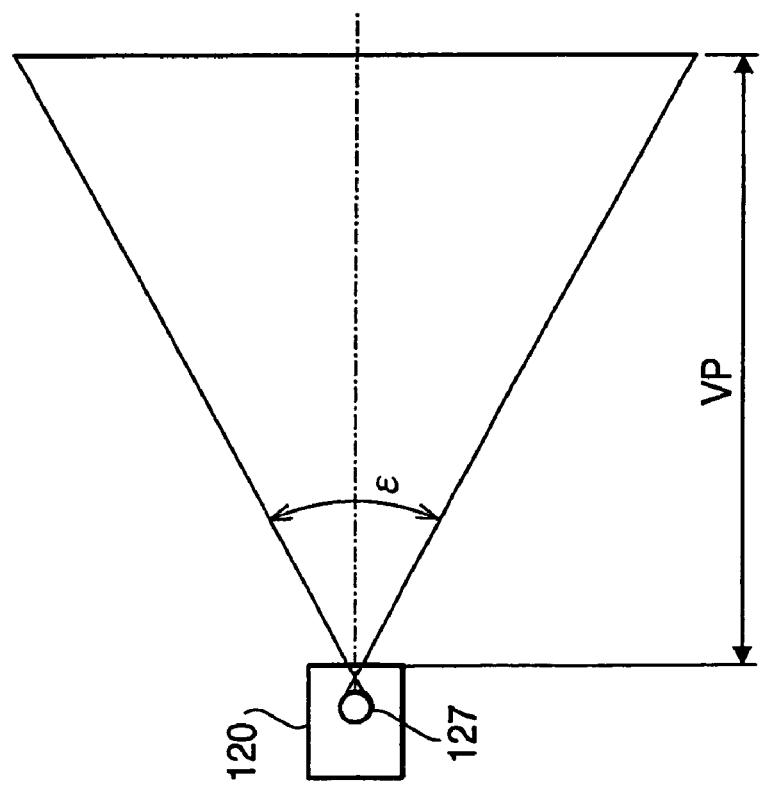
FIG.16B
FIG.16A

THREE-DIMENSIONAL SHAPE DETECTING DEVICE, IMAGE CAPTURING DEVICE, AND THREE-DIMENSIONAL SHAPE DETECTING METHOD

This is a Continuation-in-Part of International Application No. PCT/JP04/010298 filed Jul. 20, 2004, which claims priority from Japanese Patent Application No. 2003-278410 filed Jul. 23, 2003 and Japanese Patent Application No. 2003-278411 The entire disclosure of the prior applications is hereby incorporated by reference herein in its entirety.

BACKGROUND OF THE INVENTION

The present invention relates to a three-dimensional shape detecting device for detecting the three-dimensional shape of a subject by use of an optical beam, an image capturing device employing the three-dimensional shape detecting device, and a three-dimensional shape detecting method.

As a three-dimensional shape detecting device designed to project a slit beam onto a subject, capture an image of the subject (onto which the slit beam is projected) with an image capturing device, and detect the three-dimensional shape of the subject based on image data obtained by the image capturing device, the following device disclosed in Japanese Patent Provisional Publication No.HEI07-318315 is well known.

The three-dimensional shape detecting device is configured to transform an optical beam emitted by a light source into a slit beam, split the slit beam into two slit beams using a half mirror, and project the two slit beams onto a subject. The three-dimensional shape detecting device captures an image of reflecting positions of the two slit beams being reflected by the subject (hereinafter referred to as "loci of the slit beams") and figures out positions (relative to the three-dimensional shape detecting device) regarding points (pixels) in the captured image corresponding to the loci of the slit beams. Further, when the subject is a sheet-like object, the three-dimensional shape of the whole subject is estimated by the three-dimensional shape detecting device. Consequently, the three-dimensional shape of the subject is determined by the three-dimensional shape detecting device.

In the above three-dimensional shape detecting device, a slit beam generated by a light source unit is split into two slit beams by a half mirror. In this case, two slit beams having the same spread angle are emitted toward the subject, by which two slit beams of substantially the same length are projected on the subject.

Such a configuration involves the following disadvantages. For example, assuming that a point source of light having limited total emission power is used for the light source unit, half the total emission power of the light source unit is distributed to each of the two slit beams due to the two-way splitting by the half mirror. Such slit beams, sharing the power half-and-half, may be insufficient for achieving sufficient luminance of the loci necessary for precise image reading.

The above example will be explained below more concretely. Assuming that a small-sized light source used for the above three-dimensional shape detecting device for emitting an optical beam is a laser diode having a rated output (total emission power) of 1 mW, when a laser beam emitted by the laser diode is transformed into a slit beam of a spread angle of 48 degrees, the power of the slit beam per unit angular width is approximately 21 µW/degree. Since a slit beam from the light source is split into two slit beams by a half mirror in the above three-dimensional shape detecting device, the power of each slit beam equals half the aforementioned power (approximately 10 µW/degree).

When a slit beam is projected onto white paper placed 330 mm away, illumination intensity on the paper is approximately 1320 lux in the case where only one slit beam is projected onto the paper. Meanwhile, in the case where a slit beam is split into two slit beams, illumination intensity caused by each slit beam is approximately 660 lux. Incidentally, this explanation assumes that the slit beam is a red laser beam having a wavelength of 650 nm, 1 W=73 lumens, and the width of the slit beam is 0.2 mm. In places where the illumination intensity is 500-1000 lux (average room illumination), the difference of luminance between the paper and the loci of the two slit beams is small, by which the recognition or discrimination of the loci from the image data of the subject becomes difficult.

In order to realize reliable recognition of the loci of the slit beams, a light source of higher total emission power has to be employed. Increasing the power of the light source is accompanied by high power consumption, replacement of components related to the light source, a higher price of the device, and enlargement of the device.

SUMMARY OF THE INVENTION

The present invention has been made in consideration of the above problems. The primary object of the present invention is to provide a three-dimensional shape detecting device, an image capturing device and a three-dimensional shape detecting method capable of realizing reliable recognition of the loci of pattern beams on the subject while maintaining an advantage in the total emission power of the optical beam to be transformed into the pattern beams.

In order to resolve the above problems, an aspect of the present invention provides a three-dimensional shape detecting device comprising: pattern beam projection means which projects a plurality of pattern beams including two pattern beams having different angular widths; image capturing means which captures an image of a subject onto which the pattern beams are projected, from a position a prescribed distance apart from the pattern beam projection means; and three-dimensional shape calculation means which calculates positions of the pattern beams projected on the subject based on the image captured by the image capturing means and thereby determines a three-dimensional shape of the subject.

With the above configuration, the power of the two patterns (having different angular widths) per unit angular width can be made equal to that in cases where only one slit beam is outputted. Therefore, even when two pattern beams are used, the loci of the slit beams can be recognized reliably without the need of increasing the total output power of the light source unit as in the conventional three-dimensional shape detecting device.

In accordance with another aspect of the present invention, an image capturing device configured as below is provided in order to resolve the above problems. The image capturing device comprises: image capturing means for capturing an image of a prescribed surface of a subject from an arbitrary direction; storage means which stores the image captured by the image capturing means as image data; three-dimensional shape obtaining means which obtains a three-dimensional shape of the subject; and image correction means which corrects the image data stored in the storage means into plane image data of the subject viewed from a direction substantially orthogonal to the prescribed surface of the subject based on the three-dimensional shape of the subject obtained by the three-dimensional shape obtaining means. In this configuration, the three-dimensional shape obtaining means includes pattern beam projection means which projects a plurality of pattern beams including two pattern beams having different angular widths. The image capturing means captures the image of the subject onto which the pattern beams are projected, from a position a prescribed distance apart from the pattern beam projection means. The three-dimensional shape obtaining means includes three-dimensional shape calculation means which calculates positions of the pattern beams projected on the subject based on the image captured by the image capturing means and thereby obtains the three-dimensional shape of the subject.

With the above configuration, the power of the two patterns (having different angular widths) per unit angular width can be made equal to that in cases where only one slit beam is outputted. Therefore, even when two pattern beams are used, the loci of the slit beams can be recognized reliably without the need of increasing the total output power of the light source unit as in the conventional three-dimensional shape detecting device.

In accordance with another aspect of the present invention, a three-dimensional shape detecting method for detecting a three-dimensional shape of a subject is provided in order to resolve the above problems. The three-dimensional shape detecting method comprises the steps of: outputting an optical beam; transforming the optical beam into a pattern beam as a beam emitted substantially in a planar shape within a prescribed angular width and outputting the pattern beam to be projected onto the subject; capturing an image of the subject onto which the pattern beam is projected, from a position a prescribed distance apart from the outputted pattern beam; and performing a calculation for determining the three-dimensional shape of the subject by calculating a position of the pattern beam projected on the subject based on the captured image. The outputted pattern beam includes first and second pattern beams having different angular widths.

With the above configuration, the power of the two patterns (having different angular widths) per unit angular width can be made equal to that in cases where only one slit beam is outputted. Therefore, even when two pattern beams are used, the loci of the slit beams can be recognized reliably without the need of increasing the total output power of the light source unit as in the conventional three-dimensional shape detecting device.

BRIEF DESCRIPTION OF THE ACCOMPANYING DRAWINGS

FIG. 10 is a schematic diagram showing a modification of the slit beam projection unit.

FIG. 16A is a schematic diagram for explaining an angular width of a slit beam generated by a rod lens.

FIG. 16B is a schematic diagram for explaining an angular width of a slit beam generated by use of a cylindrical lens.

DETAILED DESCRIPTION OF THE EMBODIMENTS

Figure 1A:
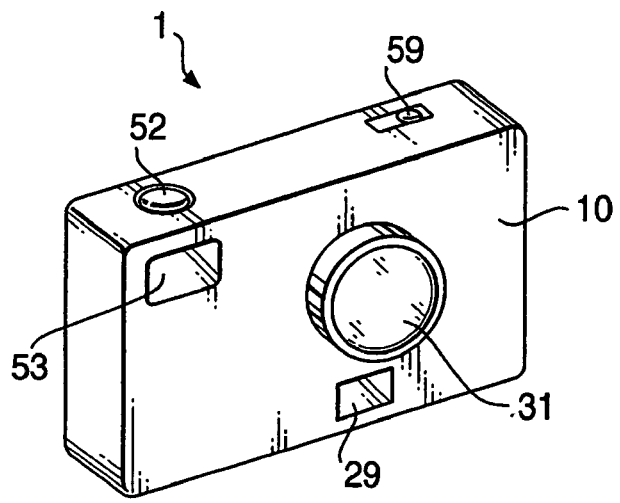
FIG. 1A is an overall perspective view of an image capturing device in accordance with a first embodiment of the present invention.

Referring now to the drawings, a description will be given in detail of preferred embodiments in accordance with the present invention.

First Embodiment

An image capturing device 1 in accordance with this embodiment is advantageous in that a goal of reliably recognizing the loci of the slit beams can be achieved without the need of increasing the total emission power of the optical beam to be transformed into the slit beams, in comparison with conventional three-dimensional shape detecting devices like the one described in Japanese Patent Provisional Publication No.HEI07-318315.

Figure 1B:
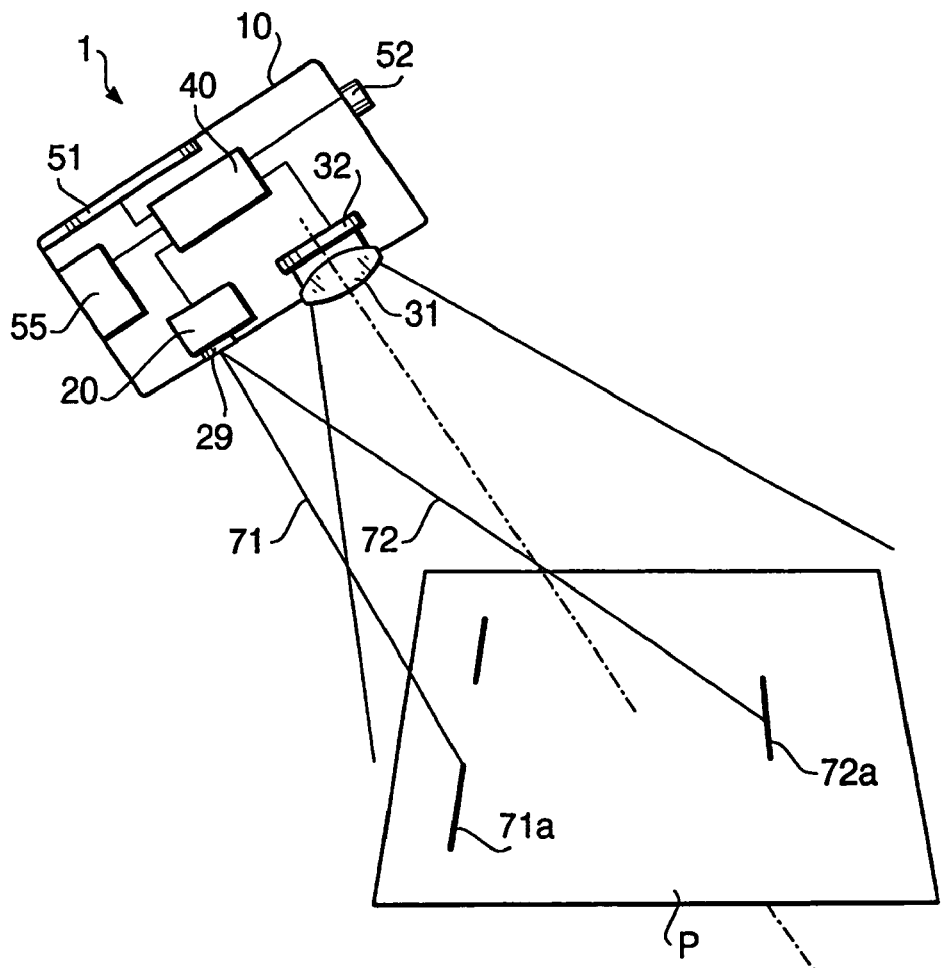
FIG. 1B is a schematic sectional view of the image capturing device.
Figure 2:
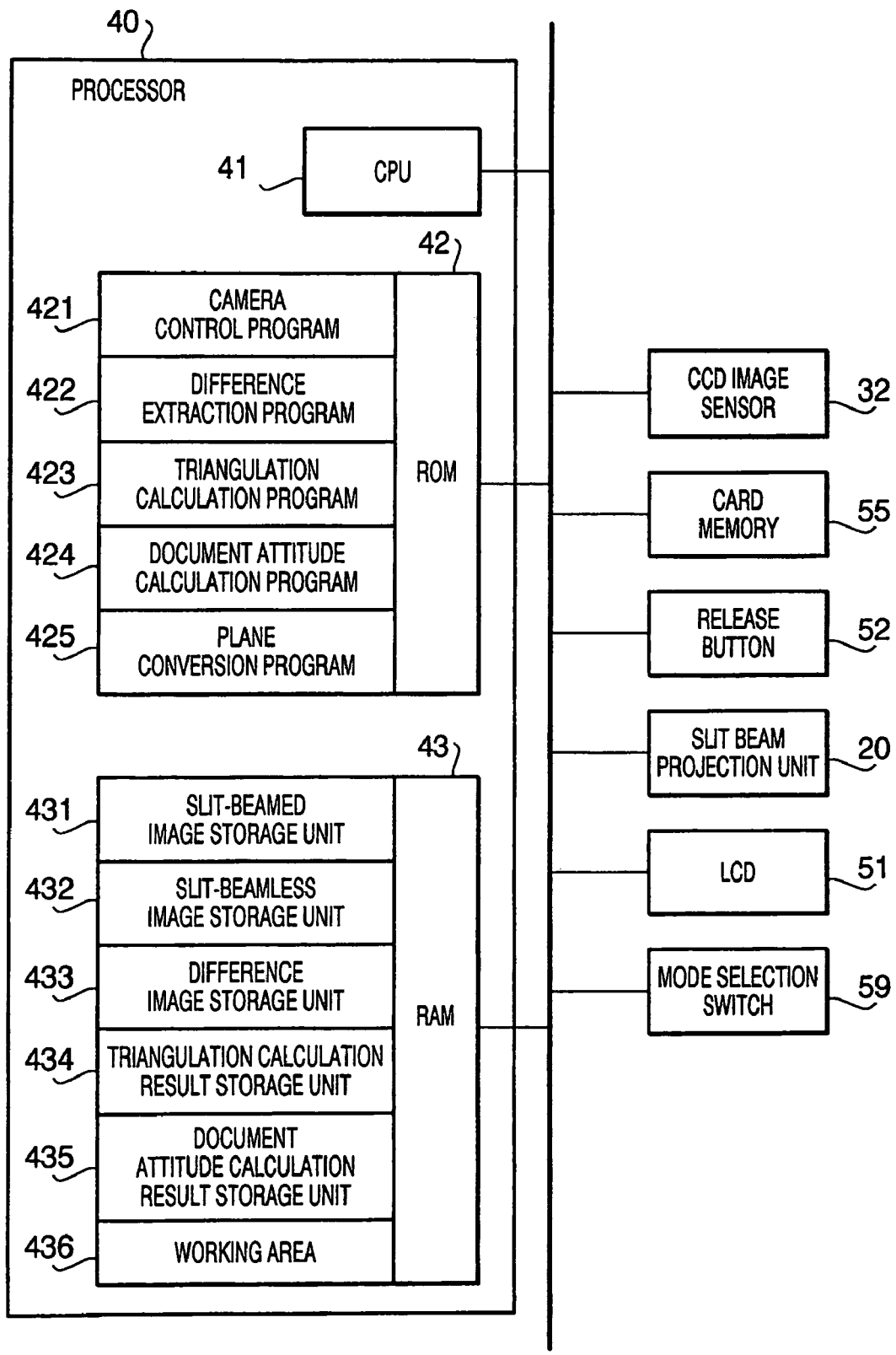
FIG. 2 is a block diagram showing the overall composition of the image capturing device of FIG. 1.

FIG. 1A is an overall perspective view of the image capturing device 1 in accordance with the first embodiment of the present invention. FIG. 1B is a schematic sectional view of the image capturing device 1, in which the status of a first slit beam 71 and a second slit beam 72 projected onto a document P is also shown. FIG. 2 is a block diagram of the image capturing device 1.

As shown in FIGS. 1A and 1B, the image capturing device 1 includes a body case 10 in a box shape, an imaging lens 31 provided at the front of the body case 10, a CCD image sensor 32 placed at the rear of the imaging lens 31 (inside the image capturing device 1) and a slit beam projection unit 20 placed underneath the imaging lens 31. The image capturing device 1 further includes a processor 40 installed in the body case 10, a release button 52 and a mode selection switch 59 placed on top of the body case 10, and a card memory 55 inserted in the body case 10. The above components are connected together by signal lines as shown in FIG. 2.

The image capturing device 1 is further equipped with an LCD (Liquid Crystal Display) 51 provided on the back of the body case 10 and a finder 53 provided to penetrate the body case 10 from its back to front. The LCD 51 and the finder 53 are used when the user decides an imaging range to be captured by the image capturing device 1.

Incidentally, the LCD 51 includes a liquid crystal display for displaying images. The LCD 51 displays images in response to image signals supplied from the processor 40. The processor 40 sends a variety of image signals to the LCD 51 depending on the situation, such as image signals for displaying real-time images captured by the CCD image sensor 32, image signals for displaying images stored in the card memory 55, image signals for displaying characters indicating the settings of the device, etc.

The image capturing device 1 has a function of "normal mode" (corresponding to the ordinary digital camera function) and a function of "corrective imaging mode". In the "normal mode", when the release button 52 is pressed by the user, an image formed by the imaging lens 31 on the CCD image sensor 32 is captured by the CCD image sensor 32 and written into the card memory 55. The "corrective imaging mode" is a function used when the subject is a document P (a sheet of paper, etc.), capable of generating corrected image data as if the document P were shot from the front even when the document P is shot from an oblique direction.

Figure 3:
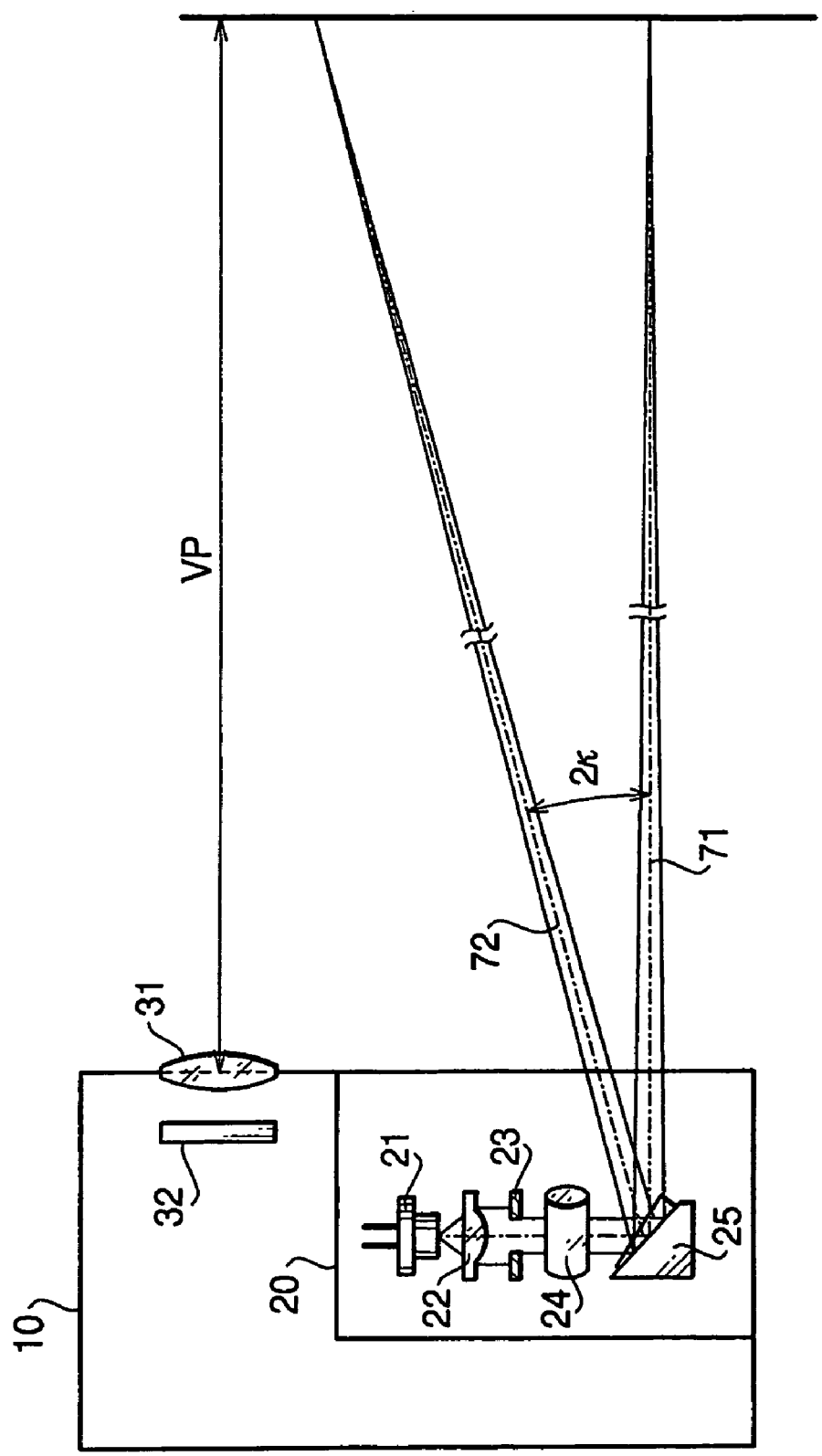
FIG. 3 is a schematic diagram showing the composition of a slit beam projection unit of the image capturing device of FIG. 1.

As shown in FIG. 3, the slit beam projection unit 20 of the image capturing device 1 includes a laser diode 21, a collimator lens 22, an aperture 23, a rod lens 24 and a reflecting mirror 25.

The laser diode 21 emits a red laser beam. The ON-OFF switching of the laser beam emission by the laser diode 21 is controlled according to instructions outputted by the processor 40. The output level (rated power) of the laser diode 21 is adjusted so that a prescribed output level (e.g. 1 mW) can be achieved at a position just after the aperture 23 relative to the maximum rated power (e.g. 5 mW), in consideration of individual differences in the spread angle of the laser beam.

The collimator lens 22 condenses the laser beam emitted by the laser diode 21 so that the beam will focus at a point a reference distance VP (e.g. 330 mm) away from the slit beam projection unit 20.

The aperture 23 is formed by a plate having a rectangular opening. The laser beam from the collimator lens 22 passing through the opening part of the aperture 23 is shaped into a beam having a rectangular cross section. The rod lens 24 is formed by a lens of a cylindrical shape having a short positive focal length. The rod lens 24 is placed on the downstream side of the aperture 23 from which the laser beam emerges.

Figure 4A:
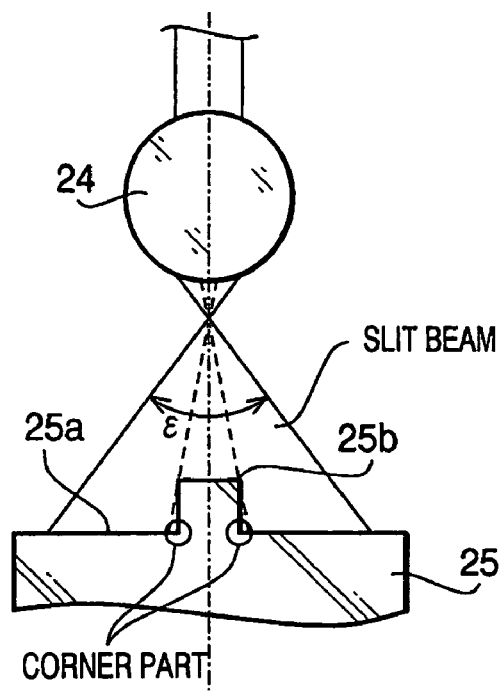
FIG. 4A shows sectional forms of a rod lens and a reflecting mirror.
Figure 4B:
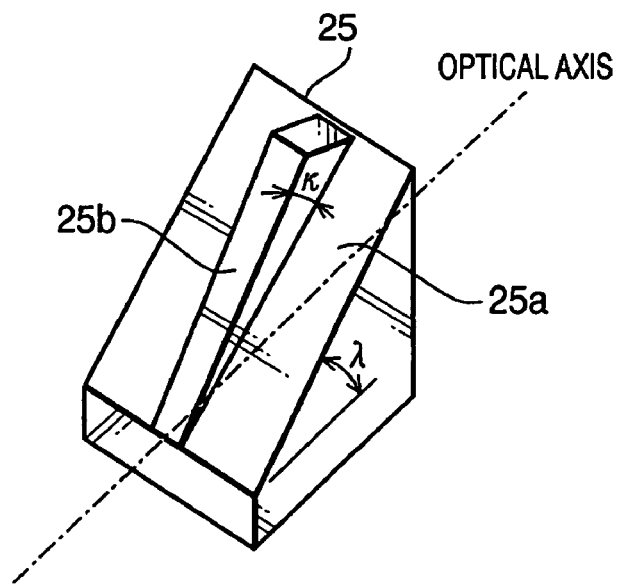
FIG. 4B is a perspective view of the reflecting mirror.

FIG. 4A shows sectional forms of the rod lens 24 and the reflecting mirror while indicating the focusing state of the laser beam. FIG. 4B is a perspective view of the reflecting mirror 25. Since the focal length of the rod lens 24 is short as shown in FIG. 4A, the laser beam passing through the rod lens 24 focuses at a focal point in the vicinity of the rod lens 24 and thereafter spreads as a slit beam having a prescribed spread angle $\epsilon$ (e.g. 48 degrees).

The reflecting mirror 25 is made of moldable optical plastic such as polymethylmethacrylate (PMMA). As shown in FIG. 4B, the reflecting mirror 25 has a first mirror surface 25a which is a prescribed angle $\lambda$ (e.g. 45 degrees) tilted from a plane parallel to the optical axis of the imaging lens 31 and a second mirror surface 25b which is formed on a wedge-shaped projection on the first mirror surface 25a. The second mirror surface 25b is formed in the central part of the first mirror surface 25a regarding a direction orthogonal to the slope of the first mirror surface 25a, to be tilted a prescribed angle $\kappa$ (e.g. 12 degrees) from the first mirror surface 25a. The surface of the reflecting mirror 25 is coated with an aluminum layer and a silicon oxide protective layer by vapor deposition so that the reflecting mirror 25 can reflect the laser beam almost totally.

The reflecting mirror 25 is placed on the downstream side of the rod lens 24 from which the slit beam emerges. The slit beam incident upon the first mirror surface 25a is reflected by the first mirror surface 25a to change its direction by twice the prescribed angle $\lambda$ (90 degrees) and emerges therefrom as the first slit beam 71. Meanwhile, the slit beam incident upon the second mirror surface 25b is reflected by the second mirror surface 25b to separate from the first slit beam 71 by twice the prescribed angle $\kappa$ (24 degrees) and emerges therefrom as the second slit beam 72. Incidentally, the directions of the emergence of the first and second slit beams 71 and 72 will hereinafter be referred to as a "first direction" and a "second direction", respectively.

As above, the slit beam projection unit 20 lets the laser diode 21 emit the laser beam according to the instructions from the processor 40 and thereby outputs the first and second slit beams 71 and 72 in the first and second directions respectively. The first and second slit beams 71 and 72 emerge from a window 29 of the body case 10 formed under the imaging lens 31.

The imaging lens 31 is formed by a plurality of lenses. The image capturing device 1 has the autofocus function, by which the imaging lens 31 is driven and the focal length and the aperture are adjusted so that light from outside will focus on the CCD image sensor 32. The CCD image sensor 32 includes a matrix-like array of photoelectric transducers like CCDs (Charge Coupled Devices). The CCD image sensor 32 generates signals corresponding to colors and intensities of light of the image forming on its surface, converts the signals into digital data, and outputs the digital data to the processor 40. Incidentally, data outputted by one CCD is pixel data of one pixel forming the image. A piece of image data includes the same number of pixel data as the CCDs.

The release button 52 is made of a push switch. The release button 52 is connected to the processor 40 and the pressing of the release button 52 by the user is detected by the processor 40. The card memory 55, implemented by a nonvolatile rewritable memory, is attachable and detachable to/from the body case 10.

The mode selection switch 59 is implemented by a slide switch that is switchable between two positions, for example. The position of a button of the mode selection switch 59 is detected by the processor 40, by which one of the two positions is recognized as the "normal mode" while the other is recognized as the "corrective imaging mode".

The processor 40 is formed by a CPU (Central Processing Unit) 41, a ROM 42 and a RAM 43. The CPU 41 executes processes according to programs stored in the ROM 42 by use of the RAM 43. The CPU 41 carries out various processes, including the detection of the pressing of the release button 52, the reading of image data from the CCD image sensor 32, the writing of image data into the card memory 55, the detection of the status of the mode selection switch 59, and the switching of the slit beams outputted by the slit beam projection unit 20.

The ROM 42 stores a camera control program 421, a difference extraction program 422, a triangulation calculation program 423, a document attitude calculation program 424 and a plane conversion program 425 (see FIG. 2).

Figure 5:
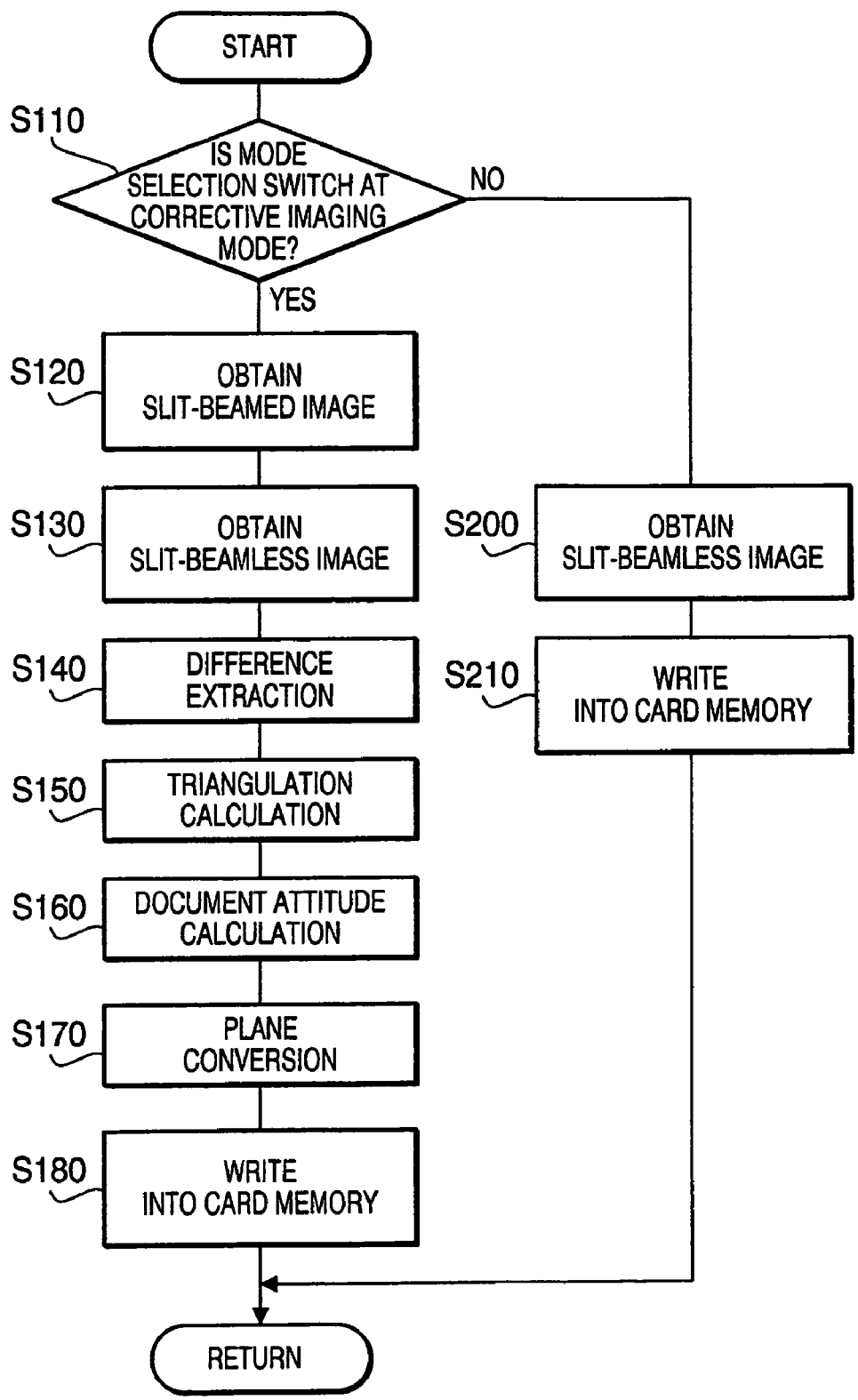
FIG. 5 is a flow chart showing a process executed by a processor of the image capturing device of FIG. 1.

The camera control program 421 is a program for the overall control of the image capturing device 1, including a process shown in a flow chart of FIG. 5 (details will be explained later).

The difference extraction program 422 is a program for generating image data in which loci of the slit beams are extracted from the image of the document P onto which the slit beams are projected.

The triangulation calculation program 423 is a program for calculating a three-dimensional spatial position for each pixel of the loci of the slit beams in the image data generated by the difference extraction program.

The document attitude calculation program 424 is a program for estimating the position and three-dimensional shape of the document P based on the three-dimensional spatial positions of the loci 71a and 72a of the first and second slit beams.

The plane conversion program 425 converts image data stored in a slit-beamless image storage unit 432 into an image of the document P shot from the front based on given position and attitude of the document P.

In the RAM 43, a slit-beamed image storage unit 431 having a size for storing data of a certain image data format outputted by the CCD image sensor 32, the slit-beamless image storage unit 432, and a difference image storage unit 433 are reserved as storage areas. Further, a triangulation calculation result storage unit 434 having a size for storing the calculation result of the position of each point of the slit-beamed image, a document attitude calculation result storage unit 435 having a size for storing the calculation result of the position and attitude of the document P, and a working area 436 having a size for temporarily storing data for the calculations by the CPU 41 are reserved in the RAM 43.

The finder 53, including an optical lens, is formed so that the user looking into the finder 53 from the rear of the image capturing device 1 can view a range substantially equal to the range of the image formed by the imaging lens 31 on the CCD image sensor 32.

In the following, the operation of the image capturing device 1 after the release button 52 is pressed by the user will be explained referring to the flow chart of FIG. 5. The operation shown in FIG. 5 is implemented under the control of the processor 40 of the image capturing device 1.

First, in S110, the position of the mode selection switch 59 is detected. If the mode selection switch 59 is at the position of the "corrective imaging mode", the process advances to S120. If the mode selection switch 59 is not at the "corrective imaging mode" but at the "normal mode", the process advances to S200.

In S120, an instruction for the emission by the laser diode 21 is issued to the slit beam projection unit 20, by which the first and second slit beams 71 and 72 are outputted from the slit beam projection unit 20. Further, image data is obtained from the CCD image sensor 32 in S120 as a slit-beamed image. The obtained image data is stored in the slit-beamed image storage unit 431 of the RAM 43.

In S130, an instruction for stopping the emission by the laser diode 21 is issued to the slit beam projection unit 20 and image data, without the first and second slit beams 71 and 72 outputted from the slit beam projection unit 20, is obtained from the CCD image sensor 32 as a slit-beamless image. The obtained image data is stored in the slit-beamless image storage unit 432 of the RAM 43.

In the next step S140, image data, extracted as the difference between the image data stored in the slit-beamed image storage unit 431 and the image data stored in the slit-beamless image storage unit 432, is generated by the difference extraction program 422, and the difference image data is stored in the difference image storage unit 433. In other words, an image of the loci 71a and 72a of the first and second slit beams projected on the document P is extracted.

In the next step S150, a three-dimensional spatial position of each pixel of the loci 71a and 72a of the first and second slit beams (extracted as the image data stored in the difference image storage unit 433) is calculated by the triangulation calculation program 423. Each calculation result of this step is stored in the triangulation calculation result storage unit 434.

In the next step S160, the position and attitude of the document P are calculated by the document attitude calculation program 424 by use of the three-dimensional spatial positions of the loci 71a and 72a of the first and second slit beams stored in the triangulation calculation result storage unit 434.

In the next step S170, the image data stored in the slit-beamless image storage unit 432 is converted by the plane conversion program 425 into image data of an image of the document P viewed from the front based on the position and attitude of the document P calculated in S160.

In the next step S180, the image data converted in S170 is stored in the card memory 55. After S180 is finished, this process is ended.

In S200, image data is obtained from the CCD image sensor 32 with no laser beam emitted from the laser diode 21 and no first and second slit beams 71 and 72 outputted by the slit beam projection unit 20. In the next step S210, the obtained image data is stored in the card memory 55. After S210 is finished, this process is ended.

Specifically, in the step S140 executed by the difference extraction program 422, the image data stored in the slit-beamless image storage unit 432 is subtracted from the image data stored in the slit-beamed image storage unit 431, that is, the subtraction of RGB values is carried out for each pixel of the image data stored in the slit-beamed image storage unit 431 and the slit-beamless image storage unit 432. By the process, a multivalued image, in which only the loci of the slit beams are extracted, is obtained.

A concrete process of the step S150 executed by the triangulation calculation program 423 is as follows, for example. Peaks of the loci 71*a* and 72*a* of the first and second slit beams in the lengthwise direction in the image data stored in the difference image storage unit 433 are obtained by barycenter calculation for each coordinate value in the crosswise direction of the image data, and a three-dimensional spatial position corresponding to each peak extraction coordinate is obtained as explained below.

Figure 6A:
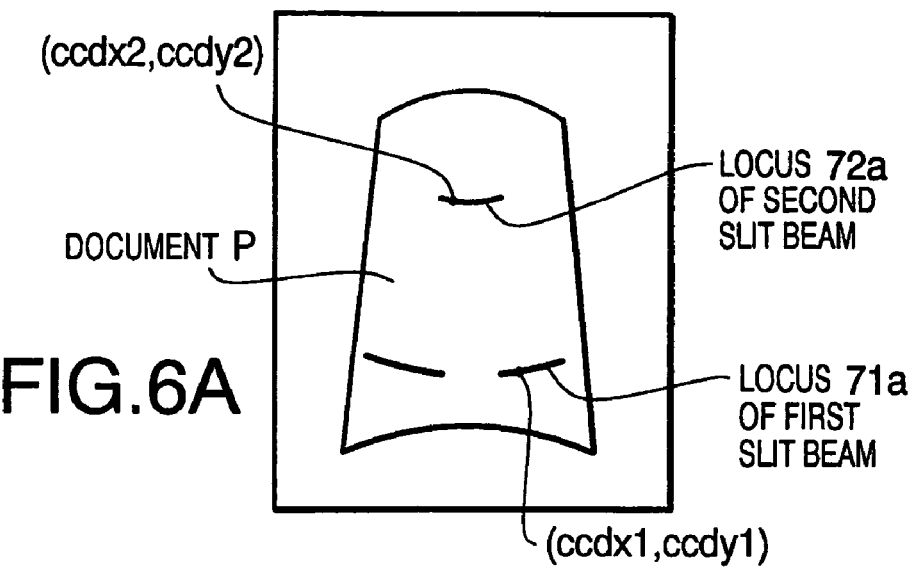
FIG. 6A is a schematic diagram for explaining a slit-beamed image captured by the image capturing device of FIG. 1.
Figure 7A:
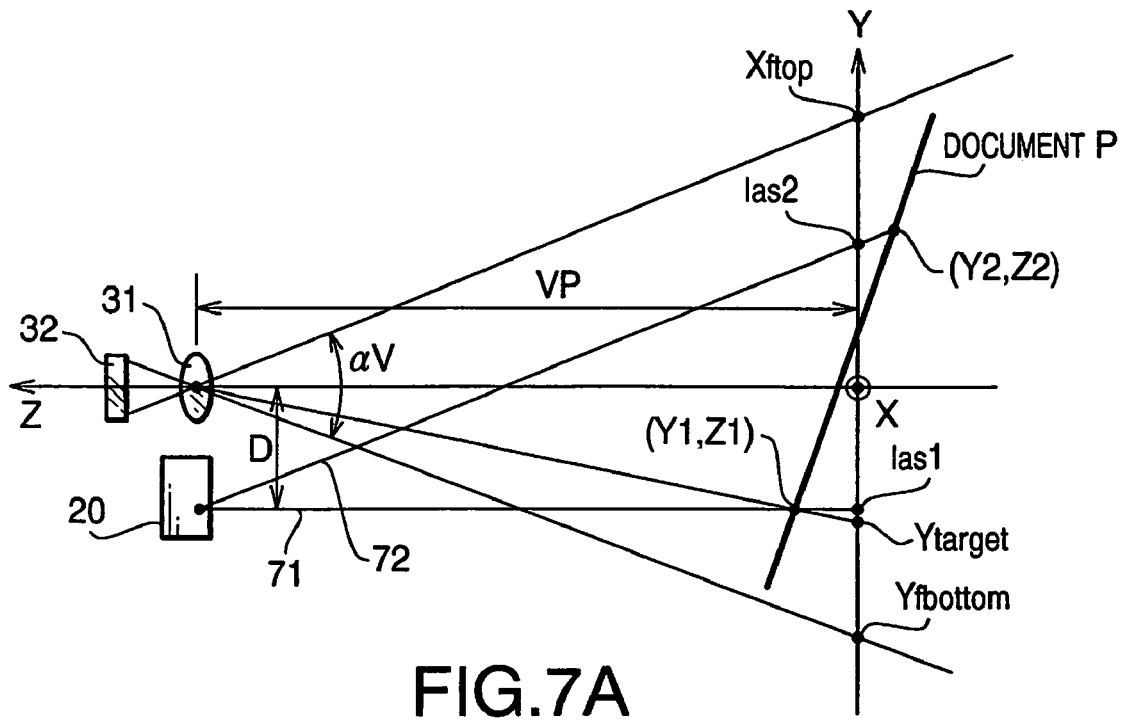
FIG. 7A is a schematic diagram showing a Y-Z plane, for explaining a method for calculating a three-dimensional spatial position.
Figure 7B:
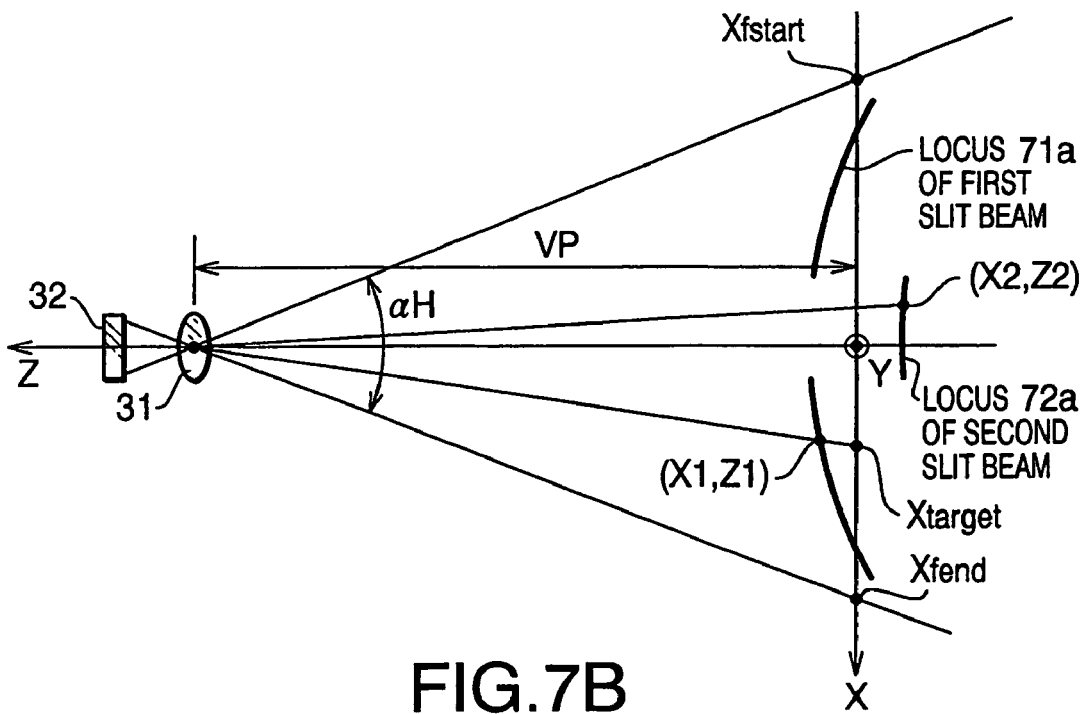
FIG. 7B is a schematic diagram showing an X-Z plane, for explaining the method for calculating the three-dimensional spatial position.

A coordinate system of the image capturing device 1 with respect to the document P (curved in the crosswise direction) being shot as shown in FIG. 6A is defined as depicted in FIGS. 7A and 7B. The optical axis direction of the imaging lens 31 is defined as a Z-axis. A position that is a reference distance VP away from the image capturing device 1 is defined as the origin of X, Y and Z-axes. A horizontal direction and a vertical direction with respect to the image capturing device 1 are defined as the X-axis and the Y-axis, respectively.

Further, the number of pixels of the CCD image sensor 32 in the X-axis direction will be called "ResX" and that in the Y-axis direction will be called "ResY". The upper end, lower end, left end and right end of the CCD image sensor 32 projected on the X-Y plane through the imaging lens 31 will be called "Yftop", "Yfbottom", "Xfstart" and "Xfend". The distance from the optical axis of the imaging lens 31 to the optical axis of the first slit beam 71 emitted from the slit beam projection unit 20 is assumed to be "D". The position of an intersection point of the first slit beam 71 and the X-Y plane measured in the Y-axis direction will be called "las1". The position of an intersection point of the second slit beam 72 and the X-Y plane measured in the Y-axis direction will be called "las2".

Under the above definitions, a three-dimensional spatial position (X1, Y1, Z1) corresponding to coordinates (ccdx1, ccdy1) of an attention point 1 (when a pixel of the image of the locus 71*a* of the first slit beam is paid attention to) on the CCD image sensor 32 is figured out from solutions of the following five simultaneous equations regarding triangles formed by the point on the imaging surface of the CCD image sensor 32, the emission point of the first and second slit beams 71 and 72, and intersection points with the X-Y plane.

$$Y1 = -((las1+D)/VP)Z1 + las1 \quad (1)$$

$$Y1 = -(Ytarget/VP)Z1 + Ytarget \quad (2)$$

$$X1 = -(Xtarget/VP)Z1 + Xtarget \quad (3)$$

$$Xtarget = Xfstart + (ccdx1/ResX) \times (Xfend - Xfstart) \quad (4)$$

$$Ytarget = Yftop - (ccdy1/ResY) \times (Yftop - Yfbottom) \quad (5)$$

Incidentally, las1=−D and thus Y1=−D in this embodiment since the first slit beam 71 is parallel to the Z-axis.

Similarly, a three-dimensional spatial position (X2, Y2, Z2) corresponding to coordinates (ccdx2, ccdy2) of an attention point 2 (when a pixel of the image of the locus 72*a* of the second slit beam is paid attention to) on the CCD image sensor 32 is figured out from solutions of the following five simultaneous equations.

$$Y2 = -((las2+D)/VP)Z2 + las2 \quad (1)$$

$$Y2 = -(Ytarget/VP)Z2 + Ytarget \quad (2)$$

$$X2 = -(Xtarget/VP)Z2 + Xtarget \quad (3)$$

$$Xtarget = Xfstart + (ccdx2/ResX) \times (Xfend - Xfstart) \quad (4)$$

$$Ytarget = Yftop - (ccdy2/ResY) \times (Yftop - Yfbottom) \quad (5)$$

Figure 8A:
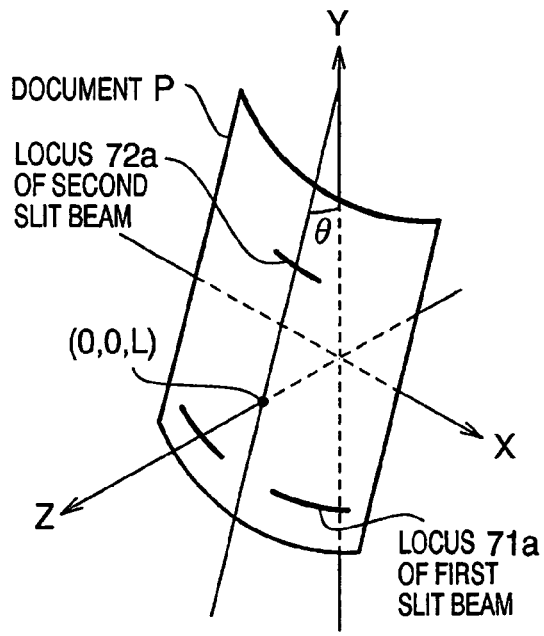
FIG. 8A shows a coordinate system used for document attitude calculation while indicating a document which has been leaned.

A concrete process of the step S160 executed by the document attitude calculation program 424 is as follows, for example. A curve is obtained by executing regression curve approximation to points at the three-dimensional spatial positions corresponding to the locus 71*a* of the first slit beam based on the data stored in the triangulation calculation result storage unit 434, and a straight line connecting a point on the curve where the position in the X-axis direction is "0" and a three-dimensional spatial position on the locus 72*a* of the second slit beam where the position in the X-axis direction is "0" is assumed. Subsequently, an intersection point of the straight line and the Z-axis (i.e. an intersection point of the optical axis and the document P) is obtained as a three-dimensional spatial position (0, 0, L) of the document P (see FIG. 8A), and the angle of the straight line with respect to the X-Y plane is obtained as a lean θ of the document P around the X-axis.

Figure 8B:
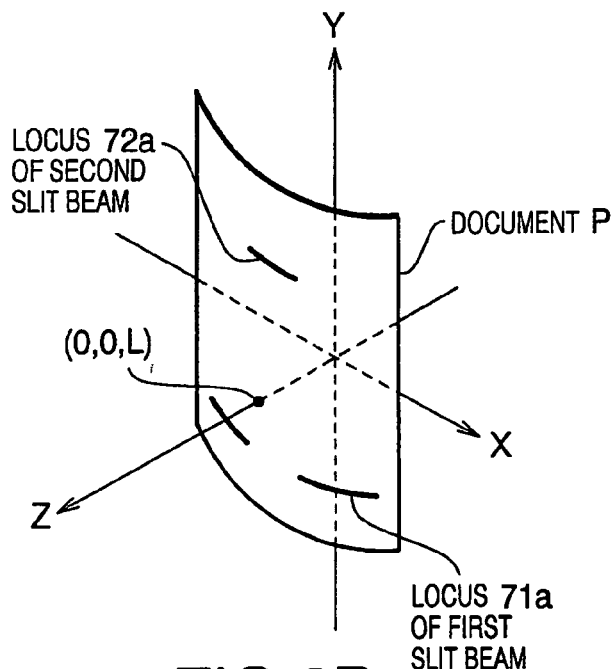
FIG. 8B shows the coordinate system used for the document attitude calculation while indicating the document placed in parallel with an X-Y plane.
Figure 8C:
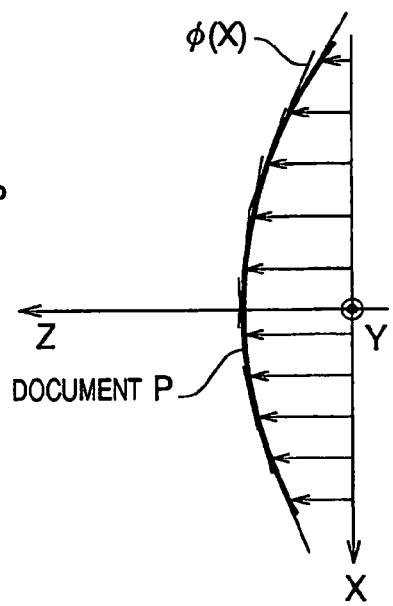
FIG. 8C shows the coordinate system used for the document attitude calculation while indicating curvature of the document.

Further, as shown in FIG. 8B, a state in which the curve obtained by the regression curve approximation of the locus 71*a* of the first slit beam is rotated by −θ (θ: the lean of the document P around the X-axis obtained above), that is, a state in which the document P is placed in parallel with the X-Y plane, is assumed. Subsequently, a cross section of the document P on the X-Z plane is considered as shown in FIG. 8C. In the sectional form of the document P in the X-axis direction, displacements of the cross section in the Z-axis direction are obtained for a plurality of positions in the X-axis direction, and based on the displacements, curvature φ(X) indicating the gradient with respect to the X-axis direction is obtained as a function of the position X in the X-axis direction.

Figure 9:
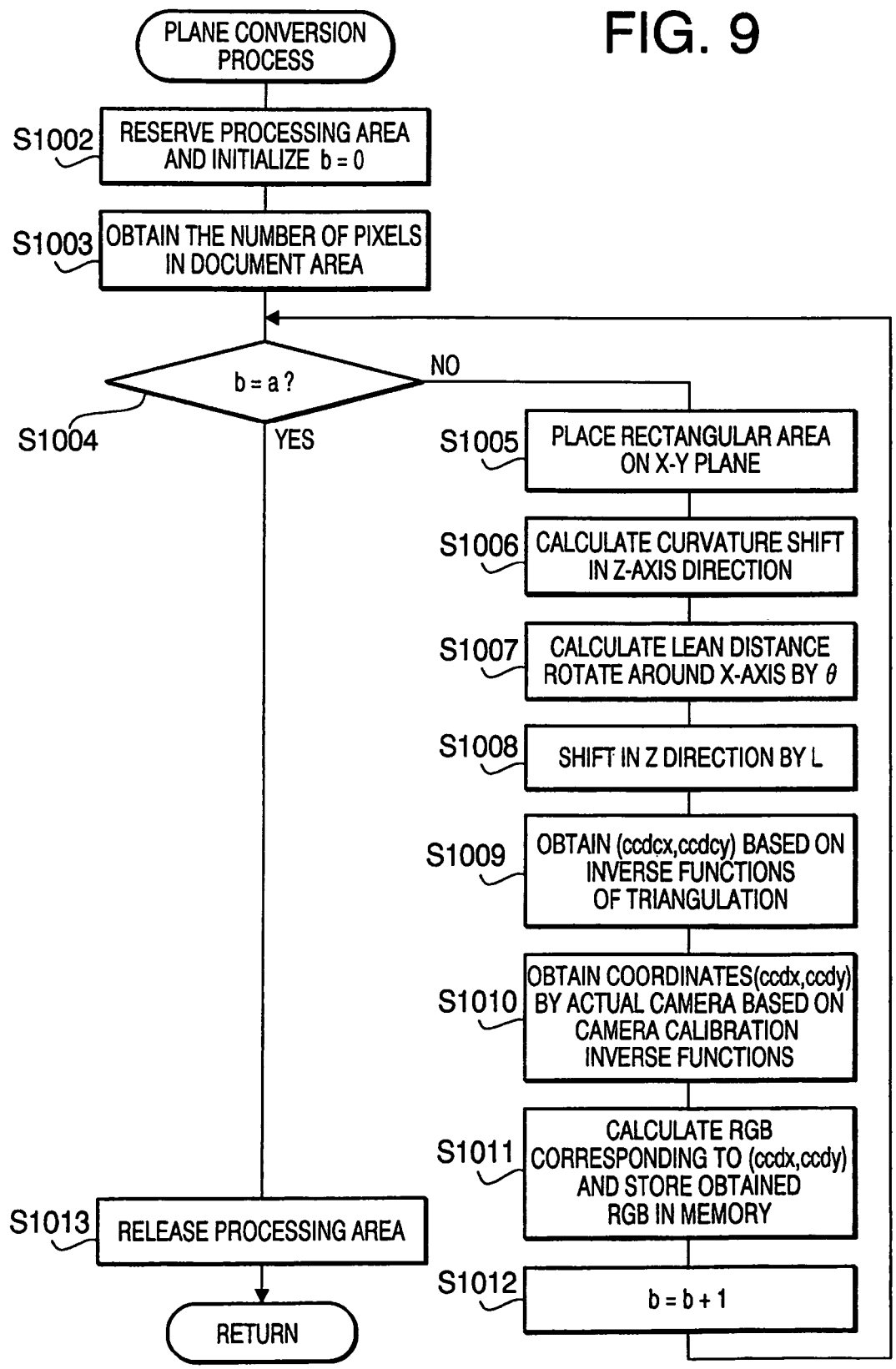
FIG. 9 is a flow chart showing a process executed by a plane conversion program in accordance with the first embodiment.

The step S170 is executed by the plane conversion program 425 according to a process shown in a flow chart of FIG. 9 which will be explained below, for example.

First, a processing area for this process is reserved in the working area 436 of the RAM 43 and initial values of variables used in this process (e.g. variables for counters) are set (S1002). Subsequently, an area of an erect image (an image of a surface of the document P on which characters, etc. are drawn or printed, viewed substantially in the vertical direction) is set by transforming points at the four corners of the slit-beamless image based on the three-dimensional spatial position (0, 0, L) of the document P, the lean θ around the X-axis and the curvature φ(X) which have been obtained by the calculations by the document attitude calculation program 424, and the number "a" of pixels contained in the area is obtained (S1003).

The area of the erect image set as above is first placed on the X-Y plane (S1005). The three-dimensional spatial position of each pixel contained in the area is shifted in the Z-axis direction based on the curvature φ (X) (S1006), rotated around the X-axis by the lean θ (S1007), shifted in the Z-axis direction by the distance L (S1008), and the obtained three-dimensional spatial position is converted into coordinates (ccdcx, ccdcy) on a CCD image captured by an ideal camera according to the aforementioned relational expressions of triangulation (S1009). Subsequently, the coordinates (ccdcx, ccdcy) are converted into coordinates (ccdx, ccdy) on a CCD image captured by the actual camera by means of a well-known calibration technique based on aberration characteristics of the imaging lens 31 being used (S1010). The state of a pixel of the slit-beamless image at the position is obtained and stored in the working area 436 of the RAM 43 (S1011). The above sequence is repeated for the number "a" of pixels, by which image data of the erect image is generated.

As above, the image capturing device 1 forms the locus 71a of the first slit beam (as a line segment having a missing part at its center) and the locus 72a of the second slit beam (of the same length as the missing part of the locus of the first slit beam 72) above the locus 71a on the document P as shown in FIG. 6A. The image capturing device 1 captures an image of the document P by letting the imaging lens 31 form the image on the CCD image sensor 32, and thereafter captures another image of the document P with no loci of slit beams formed thereon. The image of the loci 71a and 72a of the first and second slit beams is extracted from the image data by calculating the difference between the two pieces of image data, and the three-dimensional spatial position of each part of the loci 71a and 72a of the first and second slit beams is calculated according to the triangulation principle. Further, the position L, the lean θ and the curvature φ (X) of the document P are obtained from the result of the calculation and the three-dimensional shape of the document P is estimated while regarding the shape of the locus 71a of the first slit beam as a cross-sectional form of the whole document P. Based on the result of the estimation, image data which has been corrected as if a flat document P were shot from its front is recorded in the card memory 55.

Therefore, the user of the image capturing device 1 is allowed to store image data, that has been corrected as if a flat document P were shot from its front, in the card memory 55 even when the user is shooting a deformed (e.g. curved) document P from an oblique direction, by switching the mode selection switch 59 to the "corrective imaging mode", checking through the finder 53 or the LCD 51 whether a desired range of the document P has been fit in the shooting frame, and shooting the image by pressing the release button 52.

Incidentally, the image data stored in the card memory 55 can be used in various ways, such as checking the results of shooting by letting the LCD 51 display the images stored in the card memory 55, removing the card memory 55 from the image capturing device 1 and letting an external personal computer display or print the images stored in the card memory 55, etc.

Power of the first and second slit beams 71 and 72 per unit angular width is equal to that of the slit beam before being deflected (equal to the power per unit angular width in cases where only one slit beam is emitted). Therefore, by this embodiment, a sufficient difference in luminance can be secured between the document P and the loci of the slit beams, by which the locus image of the slit beams can be extracted by the difference extraction program 422 without fail.

As explained above, the image capturing device 1 is capable of detecting the three-dimensional shape of a subject with reliability, without the need of increasing the output power of the laser diode 21. Therefore, the image capturing device 1 can be implemented in a simple and compact configuration.

Figure 12A:
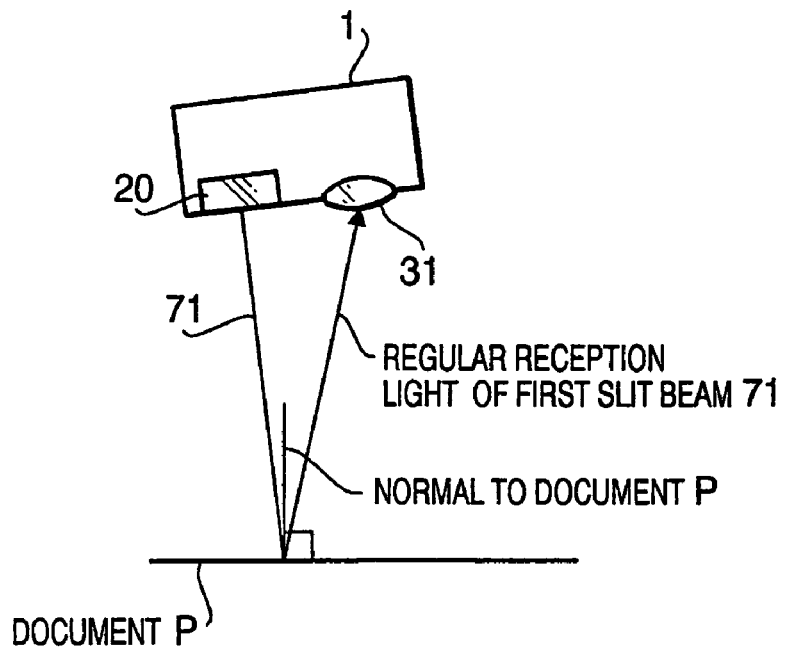
FIG. 12A is a schematic diagram for explaining an image capturing state when a smear occurs.
Figure 12B:
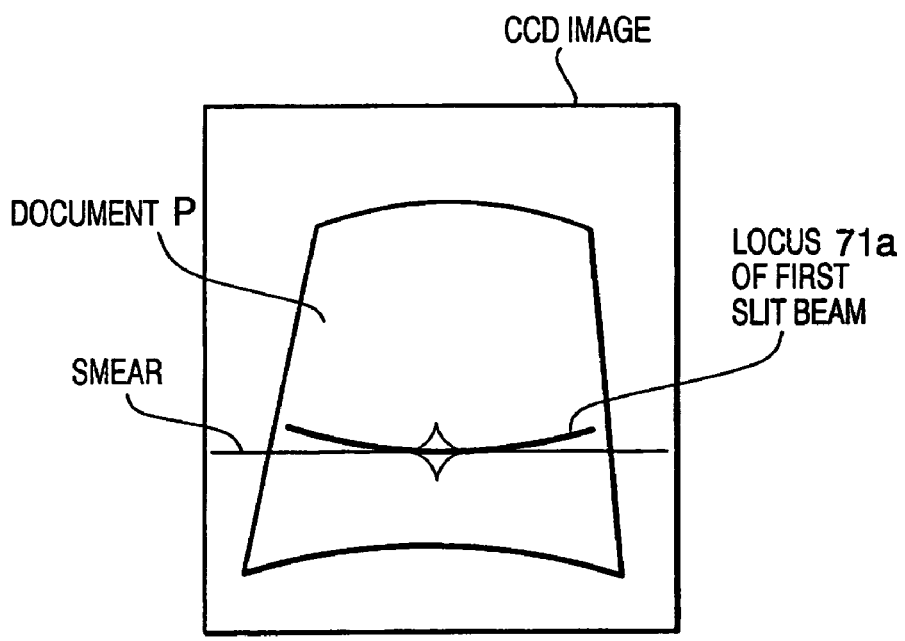
FIG. 12B is a schematic diagram showing a smear occurring on a document.

In the image capturing device 1 of this embodiment, the probability that regular reflection light caused by the first slit beam 71 is incident upon the imaging lens 31 is low since the central part of the first slit beam 71 has been deflected from the original direction. Since the angle of the second slit beam 72 to the document P is larger, in order for regular reflection light from the document P caused by the second slit beam 72 to be incident upon the imaging lens 31, the document P has to be shot from a position over 90 degrees to the document P and such a state is unlikely in actual use. As above, the image capturing device 1 does not receive regular reflection light (caused by a slit beam projected onto the document P) through the imaging lens 31, by which the problem of bright spots or smears, occurring to an image captured with regular reflection light and disabling precise detection of the three-dimensional shape, can be eliminated. Incidentally, assuming that the central part of the first slit beam 71 is not deflected as in this embodiment and a smear is caused by the central part, the situation may be as shown in FIGS. 12A and 12B.

When the reflecting mirror 25 is manufactured, a vapor-deposited layer which forms the reflecting film of the mirror surface is generally deposited from one particular direction. Therefore, reflecting film is not formed regularly on the first mirror surface 25a and lateral faces orthogonal to the second mirror surface 25b, causing discontinuity or semi-photic film having insufficient reflectance. However, when the reflecting mirror has a convex sectional shape like the reflecting mirror 25 in this embodiment, part of the slit beam from the rod lens 24 that is not reflected by the second mirror surface 25b is incident upon the first mirror surface 25a radially as shown in FIG. 4B along the paths indicated with dotted lines, by which no slit beam is incident upon lateral faces or corner parts between the first mirror surface 25a and the second mirror surface 25b. Therefore, the three-dimensional shape detection can be carried out precisely, with no slit beam incident upon an imperfect part of the reflecting film and being disturbed.

In regard to a three-dimensional shape detecting device as an embodiment of the present invention, the slit beam projection unit 20 corresponds to "pattern beam projection means", the imaging lens 31 and the CCD image sensor 32 correspond to "projected image capturing means", and the steps S140-S160 executed by the processor 40 correspond to "three-dimensional shape calculation means".

In regard to an image capturing device in accordance with the present invention, the imaging lens 31 and the CCD image sensor 32 correspond to "image capturing means", the step S170 executed by the processor 40 corresponds to "image correction means", and the RAM 42 corresponds to "storage means".

While a description has been given above of the first embodiment in accordance with the present invention, the present invention is not to be restricted by the particular illustrative embodiment but can be implemented in various other configurations. In the following, several modifications in regard to the first embodiment will be described.

For example, the subject being shot by the image capturing device 1 is not restricted to a sheet-like document P but can also be a smooth surface of a solid block or, depending on the situation, a surface of an object having ridge lines. The effect of detecting the three-dimensional shape of a subject can be achieved equally for any purpose seeking to figure out a three-dimensional shape in a three-dimensional space based on loci of substantially two slit beams.

However, if the subject is a sheet-like document P as in this embodiment, it is possible to estimate the shape of the whole document P by regarding the locus 71*a* of the first slit beam as a sectional form of the document P and thereby carry out the image correction in regard to deformation (e.g. curvature) of the document P. Further, when the subject has a three-dimensional shape substantially uniform in a direction orthogonal to the longitudinal direction of the slit beams, it is unnecessary to consider a shift in the detecting attitude due to peculiar shapes (protrusions, etc.) of parts of the subject onto which the slit beams are projected, by which the user is relieved of the need of being careful about the parts onto which the slit beams are projected.

While the first and second slit beams 71 and 72 outputted by the image capturing device 1 are formed by deflecting the slit beam emerging from the rod lens 24 with the first and second mirror surfaces 25*a* and 25*b* of the reflecting mirror 25, there are various methods of deflecting the slit beam and any one of such methods can be employed. For example, it is possible to employ a configuration shown in FIG. 10 including a single reflecting mirror 26 and a transparent flat plate 27 provided with a diffraction grating 27*a* in its particular zone (central part), instead of the reflecting mirror 25. In this configuration, the slit beam from the rod lens 24 is directly reflected by the reflecting mirror 26 to change its direction and is deflected by the diffraction grating 27*a* of the transparent flat plate 27 to a direction corresponding to the width of the grating to form the second slit beam 72. Meanwhile, the first slit beam 71 is formed of the slit beam passing through parts of the transparent flat plate 27 other than the diffraction grating 27*a*. Since a power distribution ratio of such a diffraction grating 27*a* between the 0th order beam and higher order diffracted beams can be changed by varying the grating width, it is possible to change the power of the second slit beam 72 per unit angular width.

Figure 11B:
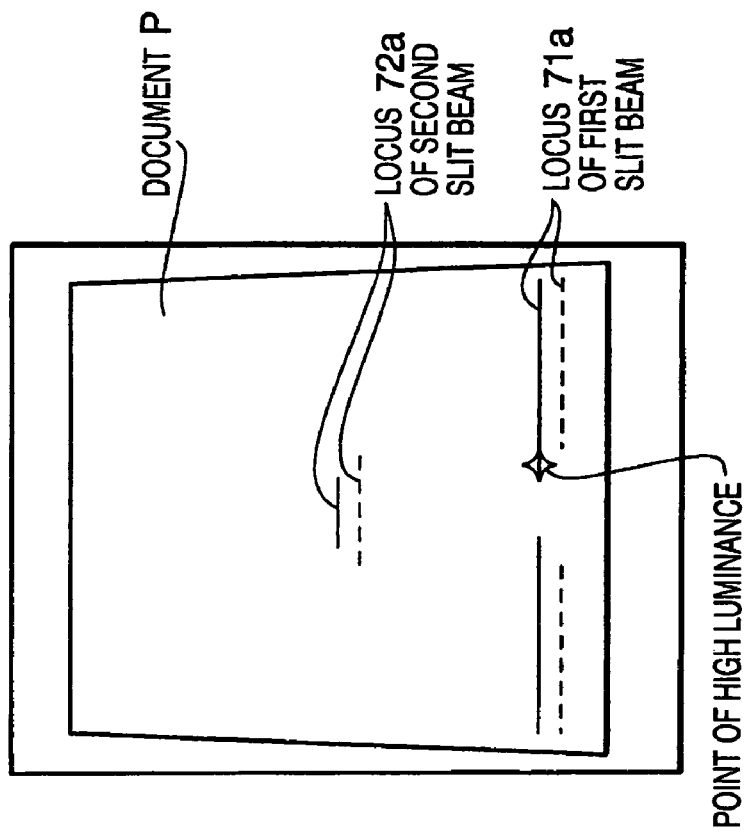
FIG. 11B is a schematic diagram showing the slit beams projected on a document by the one-dimensional micro-shift mirror array.
Figure 11A:
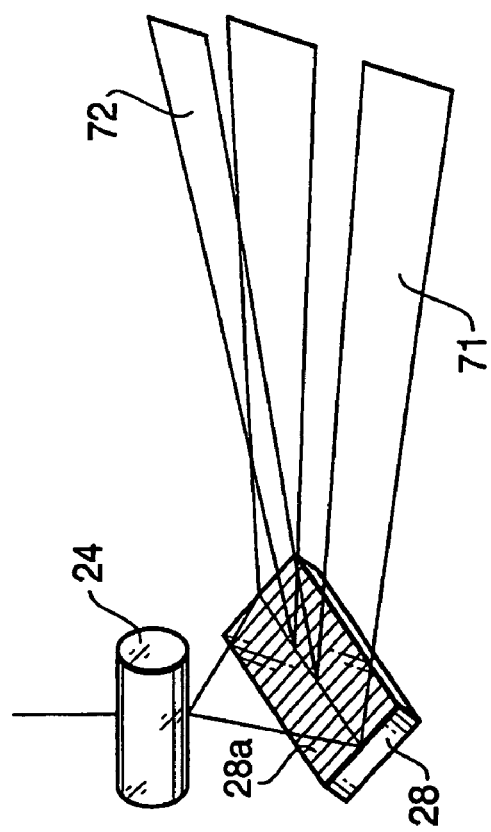
FIG. 11A is a schematic diagram showing a configuration for generating slit beams by use of a one-dimensional micro-shift mirror array.

Instead of the reflecting mirror 25, a mirror device 28 like the one shown in FIG. 11A can also be used. The mirror device 28 includes a one-dimensional micro-shift mirror array 28*a* having a plurality of mirrors in which the tilt angle of each mirror with respect to the horizontal plane can be changed by an electric signal. With such a configuration, two deflection angles can be realized for the slit beam from the rod lens 24 by changing the tilt angle of a central part of the one-dimensional micro-shift mirror array 28*a* of the mirror device 28 by instructions from the processor 40, by which the first and second slit beams 71 and 72 can be formed.

In this case, the length and position of the second slit beam can be changed depending on the status of use. For example, there are cases where regular reflection light is caused by a central part of the first slit beam 71 as shown in FIG. 11B depending on the shape of the subject. In such cases, the regular reflection light can be prevented from entering the CCD image sensor 32 by changing the tilt angle of a smear-causing part of the one-dimensional micro-shift mirror array 28*a* so that the smear-causing part will form part of the second slit beam 72.

However, the aforementioned configuration of this embodiment, forming the first and second slit beams 71 and 72 by deflecting a slit beam with the reflecting mirror 25 having the first and second mirror surfaces 25*a* and 25*b*, is capable of realizing a simple and compact configuration and low price of the device.

Figure 6B:
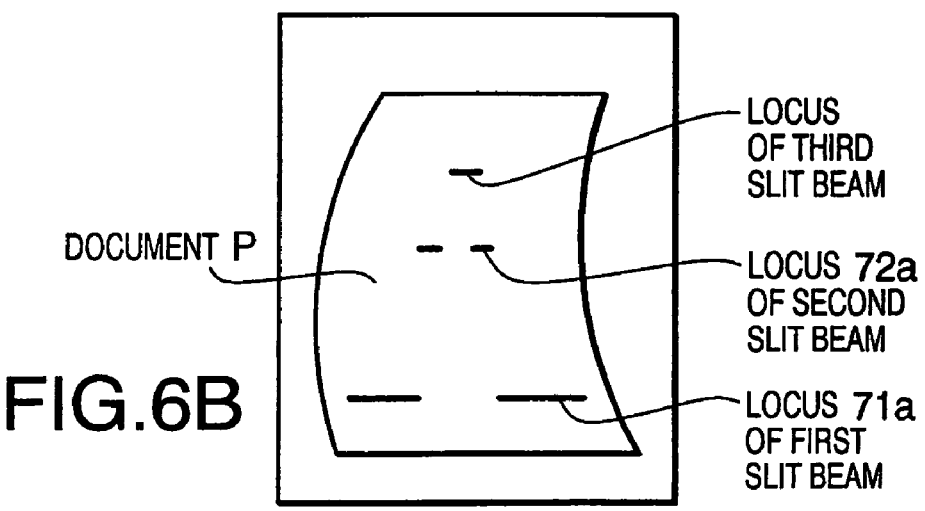
FIG. 6B is a schematic diagram showing an example in which three slit beams are projected onto a document.
Figure 6C:
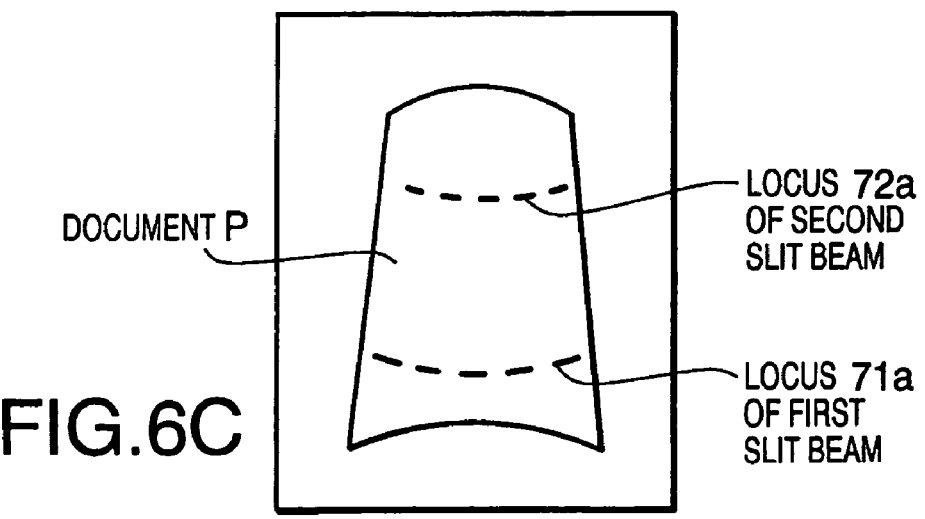
FIG. 6C is a schematic diagram showing an example in which slit beams like broken lines are projected onto the document.

The missing part of the first slit beam formed by the deflection is not restricted to one part; two or more missing parts can be formed in the first slit beam by deflection. For example, the reflecting mirror 25 may be provided with a plurality of first mirror surfaces 25*a* so that a plurality of first slit beams 71 and second slit beams 72 will be formed as indicated with broken lines in FIG. 6C showing a locus image of the slit beams projected onto the document P. With such a configuration, undulations in the curved shape of the document P can be measured both in the upper part and lower part of the document P, by which a more precise three-dimensional shape model of the document can be obtained.

While the slit beam projection unit 20 is configured to output two slit beams (the first and second slit beams 71 and 72) in the image capturing device 1 of this embodiment, the slit beam projection unit 20 may also be configured to output three or more slit beams. For example, the reflecting mirror 25 may further include a third mirror surface formed on the second mirror surface 25*b* to have a prescribed tilt angle so that a locus of a third slit beam will be formed above the locus 72*a* of the second slit beam on the document P as depicted in FIG. 6B showing a locus image of the slit beams projected onto the document P. With such a configuration, a curved shape of the document P in its lengthwise direction can also be estimated based on the positions of points on the loci of the first through third slit beams, by which the image correction can be executed also for the curved shape in the lengthwise direction and an erect image still easier to see can be obtained.

While the second slit beam 72 in this embodiment is deflected relative to the first slit beam 71 to be above the first slit beam 71, the positional relationship between the first and second slit beams 71 and 72 is not particularly limited. For example, the slit beam projection unit 20 may also be configured so that the locus 71*a* of the first slit beam will be formed below the locus 72*a* of the second slit beam when the slit-beamed image is captured, by changing the angles of the first mirror surface 25*a* and the second mirror surface 25*b* of the reflecting mirror 25. Further, the missing part of the first slit beam due to the formation of the second slit beam may be placed not in the central part but in the vicinity of an edge of the first slit beam.

The angular width of the second slit beam 72 is also not limited particularly. The reflecting mirror 25 may include a wide second mirror surface 25*b* that forms the second slit beam 72 by means of deflection across almost the whole angular width of the first slit beam.

While the laser diode 21 emitting a red laser beam is used as the light source in this embodiment, any device capable of emitting an optical beam (plane emission laser, LED, EL device, etc.) can be employed as the light source.

The shape of each slit beam outputted by the slit beam projection unit 20 is not restricted to a thin line extremely narrowed in a direction orthogonal to its longitudinal direction but can be a stripe-like beam pattern having a certain width.

While the image capturing device 1 is configured to capture the slit-beamed image and the slit-beamless image by use of the imaging lens 31 and the CCD image sensor 32, the image capturing device 1 may be provided with extra imaging lens and CCD image sensor for capturing the slit-beamed image in addition to the imaging lens 31 and the CCD image sensor 32. With such a configuration, the time lag between the capturing of the slit-beamed image and the capturing of the slit-beamless image (time for the transfer of image data from the CCD image sensor 32, etc.) can be eliminated, by which deviation in the imaging range of the slit-beamless image from that of the slit-beamed image can be eliminated and the three-dimensional shape of the subject can be detected more precisely.

However, compared to this example, the image capturing device 1 of this embodiment can realize a reduced size, price, and number of components.

As above, a "pattern beam" in this embodiment can mean a beam in a shape with a missing part (like the first slit beam 71). The size of the missing part of a pattern beam can be set variously. For example, the length of the missing part of a pattern beam relative to the whole length of the pattern beam can be ½, over ½, etc.

Second Embodiment

In the following, a second embodiment of the present invention will be described. An image capturing device 1 in accordance with this embodiment is advantageous in that goals of reducing the total emission power of the optical beam to be transformed into the slit beams and realizing a low price, low electric power consumption and a simple configuration of the three-dimensional shape detecting device can be achieved, in comparison with conventional three-dimensional shape detecting devices like the one described in Japanese Patent Provisional Publication No.HEI07-318315.

Figure 13A:
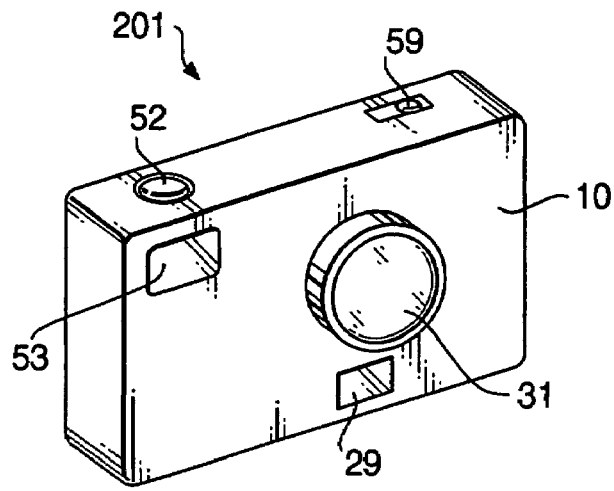
FIG. 13A is an overall perspective view of an image capturing device in accordance with a second embodiment of the present invention.
Figure 13B:
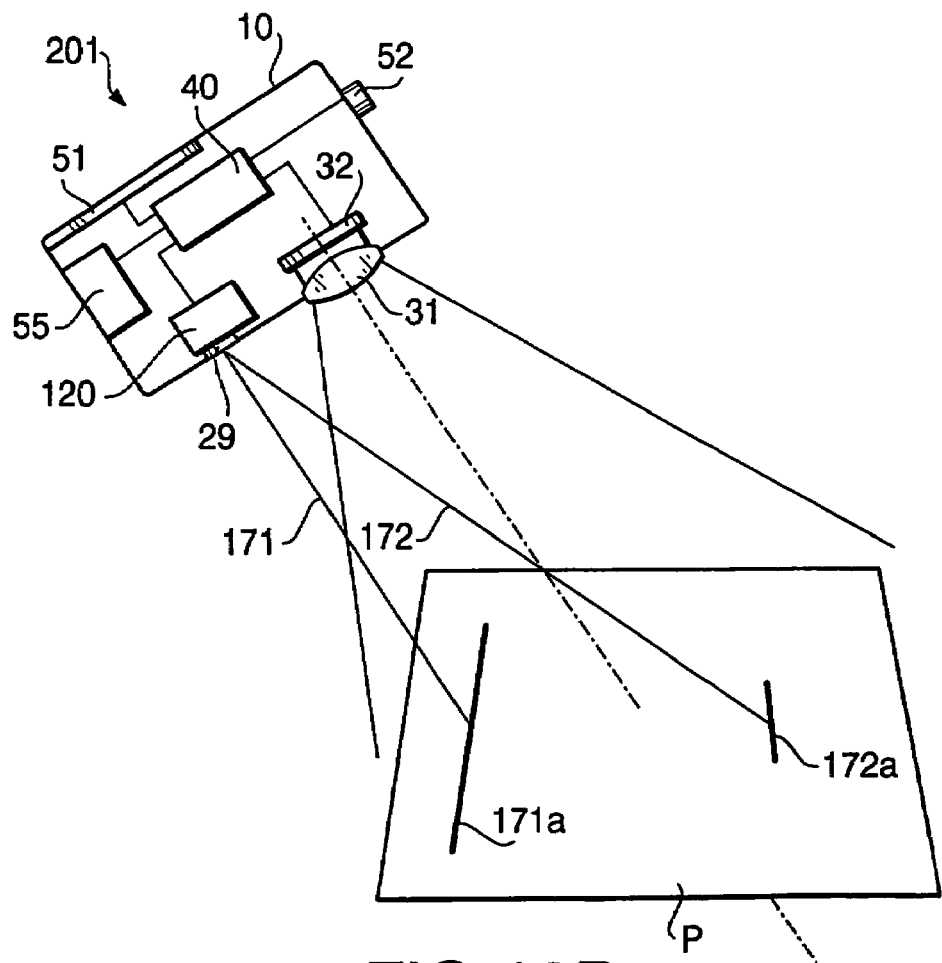
FIG. 13B is a schematic sectional view of the image capturing device.
Figure 14:
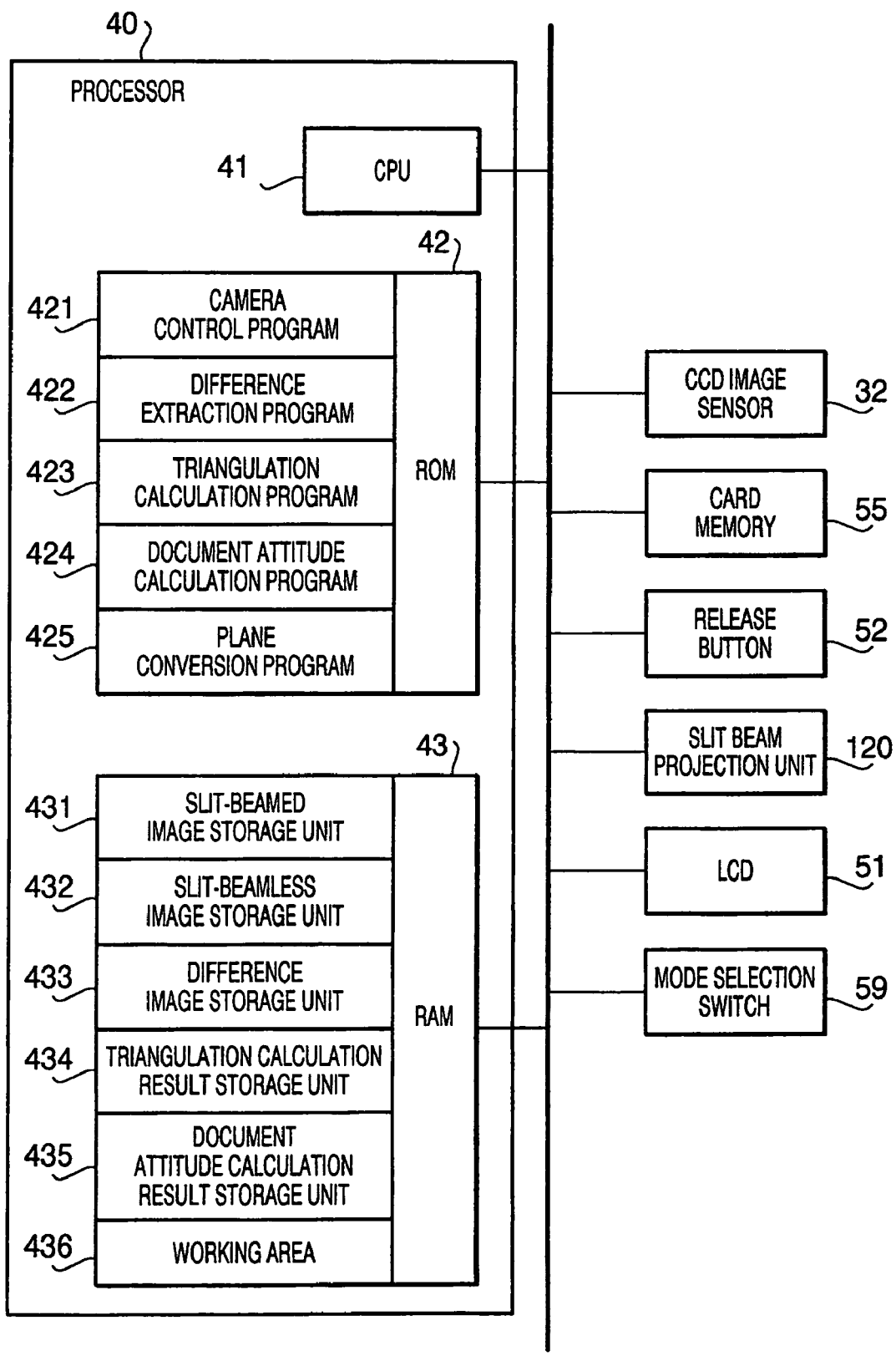
FIG. 14 is a block diagram showing the overall composition of the image capturing device of FIG. 13.

In figures which will be explained below, components having functions equivalent to those in the first embodiment are indicated with the same reference characters as those in the first embodiment. FIG. 13A is an overall perspective view of the image capturing device 1 in accordance with the second embodiment of the present invention. FIG. 13B is a schematic sectional view of the image capturing device 201, in which the status of a first slit beam 171 and a second slit beam 172 projected onto a document P is also shown. FIG. 14 is a block diagram of the image capturing device 201.

As shown in FIGS. 13A and 13B, the image capturing device 201 includes a body case 10 in a box shape, an imaging lens 31 provided at the front of the body case 10, and a CCD image sensor 32 placed at the rear of the imaging lens 31 (inside the image capturing device 1). The image capturing device 201 further includes a slit beam projection unit 120 placed underneath the imaging lens 31, a processor 40 installed in the body case 10, a release button 52 and a mode selection switch 59 placed on top of the body case 10, and a card memory 55 inserted in the body case 10. The above components are connected together by signal lines as shown in FIG. 14.

The image capturing device 201 is further equipped with an LCD (Liquid Crystal Display) 51 provided on the back of the body case 10 and a finder 53 provided to penetrate the body case 10 from its back to front. The LCD 51 and the finder 53 are used when the user decides the imaging range to be captured by the image capturing device 201.

The LCD 51 includes a liquid crystal display for displaying images. The LCD 51 displays images in response to image signals supplied from the processor 40. The processor 40 sends a variety of image signals to the LCD 51 depending on the situation, such as image signals for displaying real-time images captured by the CCD image sensor 32, image signals for displaying images stored in the card memory 55, image signals for displaying characters indicating the settings of the device, etc.

The image capturing device 201 has the function of the "normal mode" (corresponding to the ordinary digital camera function) and the function of the "corrective imaging mode".

In the "normal mode", when the release button 52 is pressed by the user, an image formed by the imaging lens 31 on the CCD image sensor 32 is captured by the CCD image sensor 32 and written into the card memory 55. The "corrective imaging mode" is the function used when the subject is a document P (a sheet of paper, etc.), capable of generating corrected image data as if the document P were shot from the front even when the document P is shot from an oblique direction.

Figure 15:
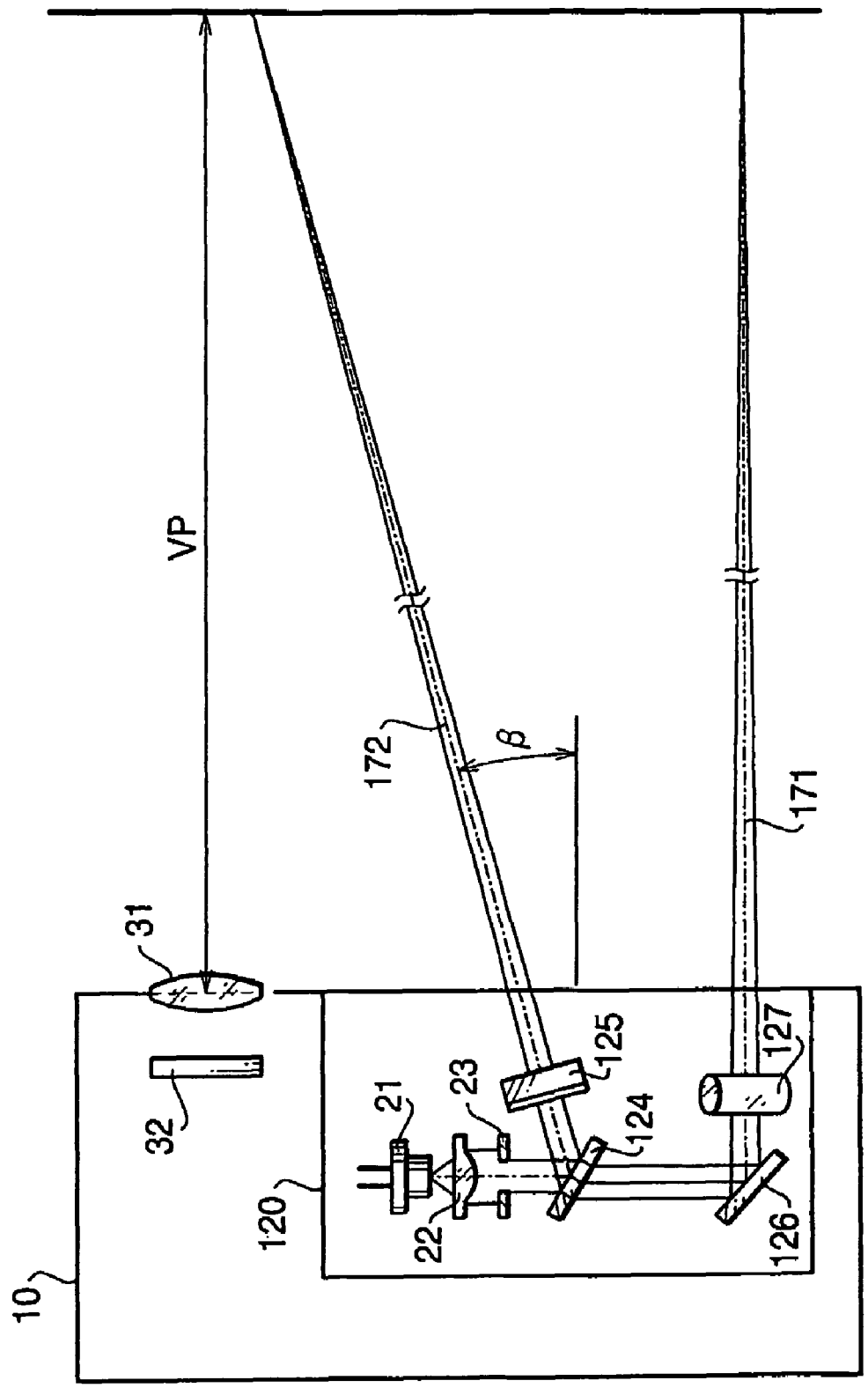
FIG. 15 is a schematic diagram showing the composition of a slit beam projection unit of the image capturing device of FIG. 13.

As shown in FIG. 15, the slit beam projection unit 120 of the image capturing device 201 includes a laser diode 21, a collimator lens 22, an aperture 23, a transparent flat plate 124, a cylindrical lens 125, a reflecting mirror 126 and a rod lens 127.

The laser diode 21 emits a red laser beam. The ON-OFF switching of the laser beam emission by the laser diode 21 is controlled by the processor 40. The output level (rated power) of the laser diode 21 is adjusted so that a prescribed output level (e.g. 1 mW) can be achieved at a position just after the aperture 23 relative to the maximum rated power (e.g. 5 mW), in consideration of individual differences in the spread angle of the laser beam.

The collimator lens 22 condenses the laser beam emitted by the laser diode 21 so that the beam will focus at a point a reference distance VP (e.g. 330 mm) away from the slit beam projection unit 120.

The aperture 23 is formed by a plate having a rectangular opening part. The laser beam from the collimator lens 22 passing through the opening part of the aperture 23 is shaped into a beam having a rectangular cross section.

The transparent flat plate 124 is composed of a transparent flat plate made of pure glass material, etc. The back of the transparent flat plate 124 is provided with an AR coat (anti-reflection coating). The transparent flat plate 124 is placed so that a reflected beam from the transparent flat plate 124 (i.e. the second slit beam 172) at the front of the body case 10 will have a prescribed angle β (e.g. 33 degrees) with respect to a plane orthogonal to the optical axis of the laser beam emerging from the aperture 23. Approximately 5% of the power of the laser beam incident upon the transparent flat plate 124 from the aperture 23 (approximately 50 μW) is reflected by the surface of the transparent flat plate 124, while approximately 95% (approximately 950 μW) of the power passes through the transparent flat plate 124. The direction of the laser beam after being reflected by the transparent flat plate 124 (frontward from the image capturing device 1 and 33 degrees upward relative to the horizontal plane) will hereinafter be referred to as a "second direction".

The reflecting mirror 126 includes a member (mirror, etc.) totally reflecting the laser beam. The reflecting mirror 126 is placed on the downstream side of the transparent flat plate 124 transmitting the laser beam, while being tilted toward the front of the body case 10 to be at 45 degrees with respect to the horizontal plane. The laser beam is totally reflected by the reflecting mirror 126 to change its optical path direction by 90 degrees. The direction of the laser beam after being reflected by the reflecting mirror 126 (frontward from the image capturing device 1 and at 0 degrees relative to the horizontal plane) will hereinafter be referred to as a "first direction".

The rod lens 127 is formed by a lens of a cylindrical shape having a short positive focal length. The rod lens 127 is placed on the downstream side of the reflecting mirror 126 reflecting the laser beam so that the axis of the cylindrical shape will be in the vertical direction. Since the focal length of the rod lens 127 is short, the laser beam entering the rod lens 127 crosses a focal point in the vicinity of the rod lens 127 and thereafter travels in the first direction as a spreading slit beam having a prescribed spread angle ε (e.g. 48 degrees) as shown in FIG. 16A. The slit beam emerging from the rod lens 127 will hereinafter be referred to as the "first slit beam 171".

The cylindrical lens 125 is a lens having a concave shape on its one side to have a negative focal length. The cylindrical lens 125 is placed on the downstream side of the transparent flat plate 124 reflecting the laser beam so that its lens surface will be orthogonal to the second direction. As shown in FIG. 16B, the cylindrical lens 125 outputs the laser beam supplied from the transparent flat plate 124 as a spreading slit beam (with a spread angle κ) in the second direction. The slit beam emerging from the cylindrical lens 125 will hereinafter be referred to as the "second slit beam 172". Specifically, the ratio between the spread angle κ of the second slit beam 172 after passing through the cylindrical lens 125 and the spread angle ε of the first slit beam 171 is equal to the power ratio between the laser beams split by the transparent flat plate 124. Therefore, the spread angle κ of the second slit beam 172 is 5% of the spread angle ε of the first slit beam 171 (i.e. κ=2.4 degrees).

With the above configuration, the slit beam projection unit 120 lets the laser diode 21 emit the laser beam according to instructions from the processor 40 and thereby outputs the first and second slit beams 171 and 172 in the first and second directions respectively through a window 29 of the body case 10 formed under the imaging lens 31.

The imaging lens 31 is formed by a plurality of lenses. The image capturing device 201 has the autofocus function, by which the imaging lens 31 is driven and the focal length and the aperture are adjusted so that light from outside will focus on the CCD image sensor 32. The CCD image sensor 32 includes a matrix-like array of photoelectric transducers like CCDs (Charge Coupled Devices). The CCD image sensor 32 generates signals corresponding to colors and intensities of light of the image forming on its surface, converts the signals into digital data, and outputs the digital data to the processor 40. Incidentally, data outputted by one CCD is pixel data of one pixel forming the image. A piece of image data includes the same number of pixel data as the CCDs.

The release button 52 is made of a push switch. The release button 52 is connected to the processor 40 and the pressing of the release button 52 by the user is detected by the processor 40. The card memory 55, implemented by a nonvolatile rewritable memory, is attachable and detachable to/from the body case 1.

The mode selection switch 59 is implemented by a slide switch that is switchable between two positions, for example. The position of a button of the mode selection switch 59 is detected by the processor 40, by which one of the two positions is recognized as the "normal mode" while the other is recognized as the "corrective imaging mode".

The processor 40 is formed by a CPU (Central Processing Unit) 41, a ROM 42 and a RAM 43. The CPU 41 executes processes according to programs stored in the ROM 42 by use of the RAM 43. The CPU 41 carries out various processes, including the detection of the pressing of the release button 52, the reading of image data from the CCD image sensor 32, the writing of image data into the card memory 55, the detection of the status of the mode selection switch 59, and the switching of the slit beams outputted by the slit beam projection unit 120.

The ROM 42 stores a camera control program 421, a difference extraction program 422, a triangulation calculation program 423, a document attitude calculation program 424 and a plane conversion program 425 (see FIG. 2).

The camera control program 421 is a program for the overall control of the image capturing device 1, including a process shown in a flow chart of FIG. 17 (details will be explained later).

The difference extraction program 422 is a program for generating image data in which loci of the slit beams are extracted from the image of the document P onto which the slit beams are projected.

The triangulation calculation program 423 is a program for calculating a three-dimensional spatial position for each pixel of the loci of the slit beams in the image data generated by the difference extraction program.

The document attitude calculation program 424 is a program for estimating the position and three-dimensional shape of the document P based on the three-dimensional spatial positions of the loci 171a and 172a of the first and second slit beams.

The plane conversion program 425 converts image data stored in a slit-beamless image storage unit 432 into an image of the document P shot from the front based on given position and attitude of the document P.

In the RAM 43, a slit-beamed image storage unit 431 having a size for storing data of a certain image data format outputted by the CCD image sensor 32, the slit-beamless image storage unit 432, and a difference image storage unit 433 are reserved as storage areas. Further, a triangulation calculation result storage unit 434 having a size for storing the calculation result of the position of each point of the slit-beamed image, a document attitude calculation result storage unit 435 having a size for storing the calculation result of the position and attitude of the document P, and a working area 436 having a size for temporarily storing data for the calculations by the CPU 41 are reserved in the RAM 43.

The finder 53, including an optical lens, is formed so that the user looking into the finder 53 from the rear of the image capturing device 201 can view a range substantially equal to the range of the image formed by the imaging lens 31 on the CCD image sensor 32.

Figure 17:
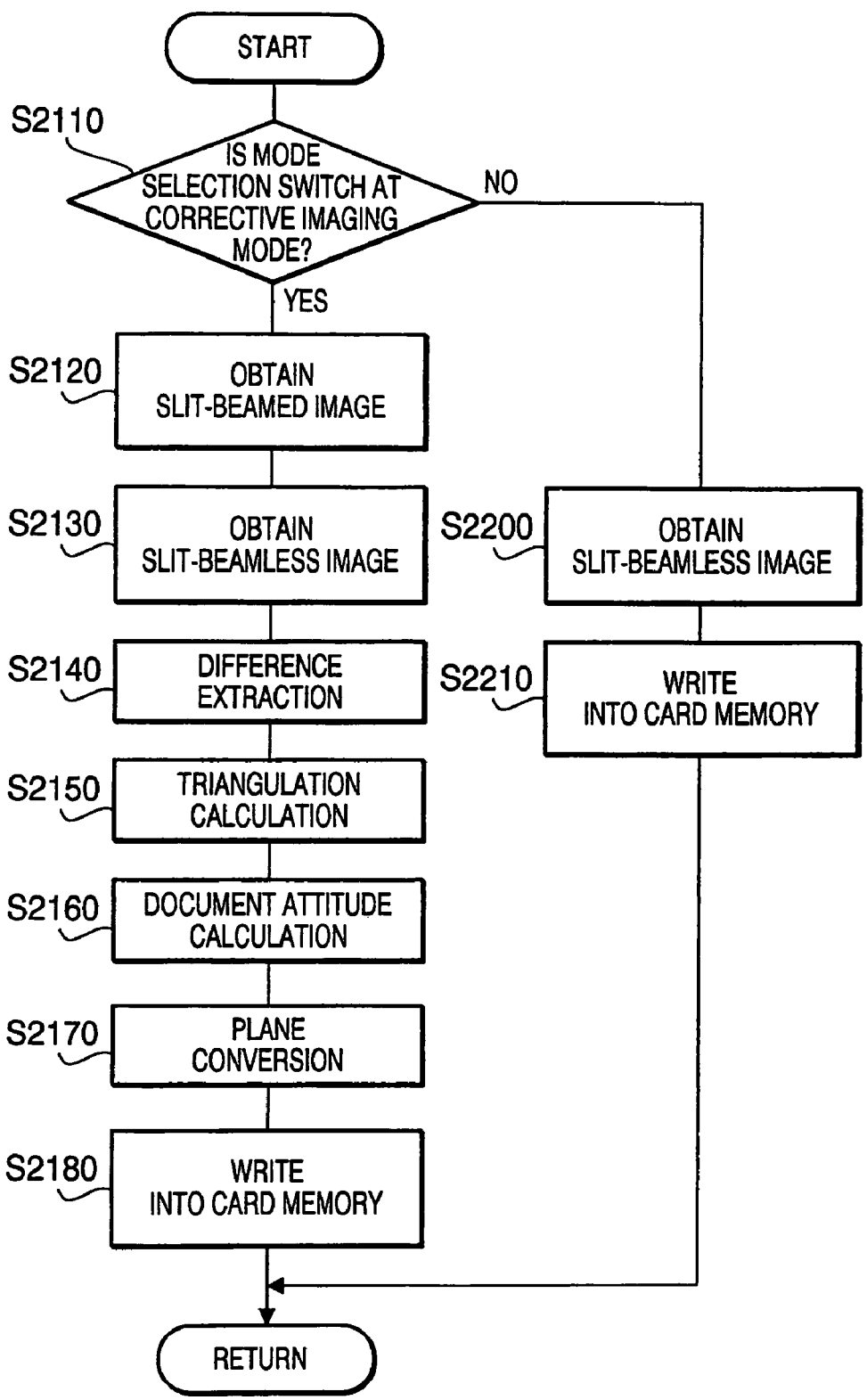
FIG. 17 is a flow chart showing a process executed by a processor of the image capturing device of FIG. 1.

In the following, the operation of the image capturing device 201 after the release button 52 is pressed by the user will be explained referring to the flow chart of FIG. 17 showing a process executed by the processor 40 of the image capturing device 201.

In S2110, the position of the mode selection switch 59 is detected. If the mode selection switch 59 is at the position of the "corrective imaging mode" (S2110: YES), the process advances to S2120. If the mode selection switch 59 is at the position of the "normal mode" (S2110: NO), the process advances to S2200.

In the next step S2120, an instruction for the emission by the laser diode 21 is issued to the slit beam projection unit 120, by which the first and second slit beams 171 and 172 are outputted from the slit beam projection unit 120. In this state, image data is obtained from the CCD image sensor 32 and the obtained image data is stored in the slit-beamed image storage unit 431 of the RAM 43 as a slit-beamed image.

In the next step S2130, an instruction for stopping the emission by the laser diode 21 is issued to the slit beam projection unit 120 and image data, without the first and second slit beams 171 and 172 outputted from the slit beam projection unit 120, is obtained from the CCD image sensor 32. The obtained image data is stored in the slit-beamless image storage unit 432 as a slit-beamless image.

In the next step S2140, the difference between the image data stored in the slit-beamed image storage unit 431 and the image data stored in the slit-beamless image storage unit 432 is extracted by the difference extraction program 422. In other words, image data, in which the loci 171*a* and 172*a* of the first and second slit beams projected on the document P are extracted, is generated and the generated image data is stored in the difference image storage unit 433.

In the next step S2150, a three-dimensional spatial position of each pixel of the loci 171*a* and 172*a* of the first and second slit beams (extracted as the image data stored in the difference image storage unit 433) is calculated by the triangulation calculation program 423. Each calculation result of this step is stored in the triangulation calculation result storage unit 434.

In the next step S2160, the position and attitude of the document P are calculated by the document attitude calculation program 424 by use of the three-dimensional spatial positions of the loci of the first and second slit beams 171 and 172 stored in the triangulation calculation result storage unit 434.

In the next step S2170, the image data stored in the slit-beamless image storage unit 432 is converted by the plane conversion program 425 into image data of an image of the document P viewed from the front based on the position and attitude of the document P calculated in S2160.

In the next step S2180, the image data converted in S2170 is stored in the card memory 55. After S2170 is finished, the process of FIG. 17 is ended.

In S2200, image data is obtained from the CCD image sensor 32 with no laser beam emitted from the laser diode 21 of the slit beam projection unit 120, that is, with no first and second slit beams 171 and 172 outputted by the slit beam projection unit 120. In the next step S2210, the obtained image data is stored in the card memory 55. After S2210 is finished, the process of FIG. 17 is ended.

A concrete process of the step S2140 executed by the difference extraction program 422 is as follows. The image data stored in the slit-beamless image storage unit 432 is subtracted from the image data stored in the slit-beamed image storage unit 431 in regard to each pixel, that is, the subtraction of RGB values is carried out for each pixel of the image data stored in the slit-beamed image storage unit 431 and the slit-beamless image storage unit 432. By the process, a multivalued image, in which only the loci of the slit beams are extracted, is obtained.

A concrete process of the step S2150 executed by the triangulation calculation program 423 is as follows, for example. Peaks of the loci 171*a* and 172*a* of the first and second slit beams in the lengthwise direction in the image data stored in the difference image storage unit 433 are obtained by barycenter calculation for each coordinate value in the crosswise direction of the image data. Further, a three-dimensional spatial position corresponding to each peak extraction coordinate is obtained as explained below.

Figure 18A:
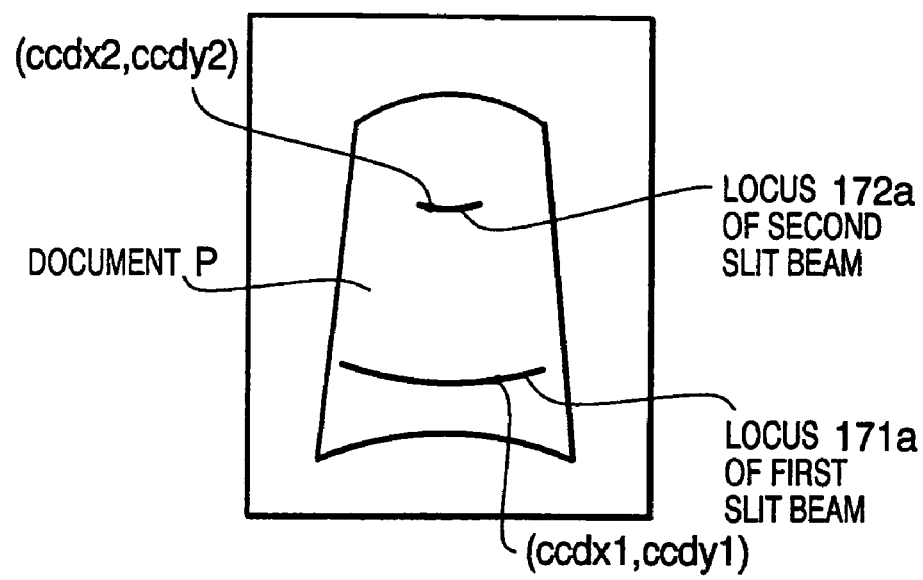
FIG. 18A is a schematic diagram for explaining a slit-beamed image captured by the image capturing device of FIG. 13.
Figure 19A:
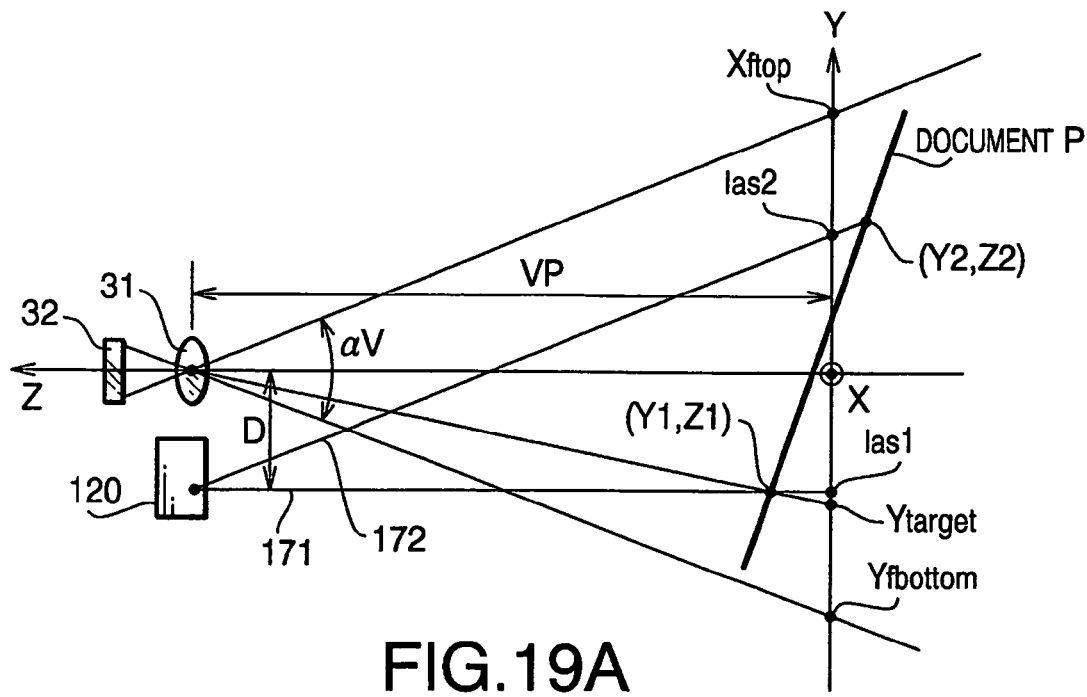
FIG. 19A is a schematic diagram showing a Y-Z plane, for explaining a method for calculating a three-dimensional spatial position.
Figure 19B:
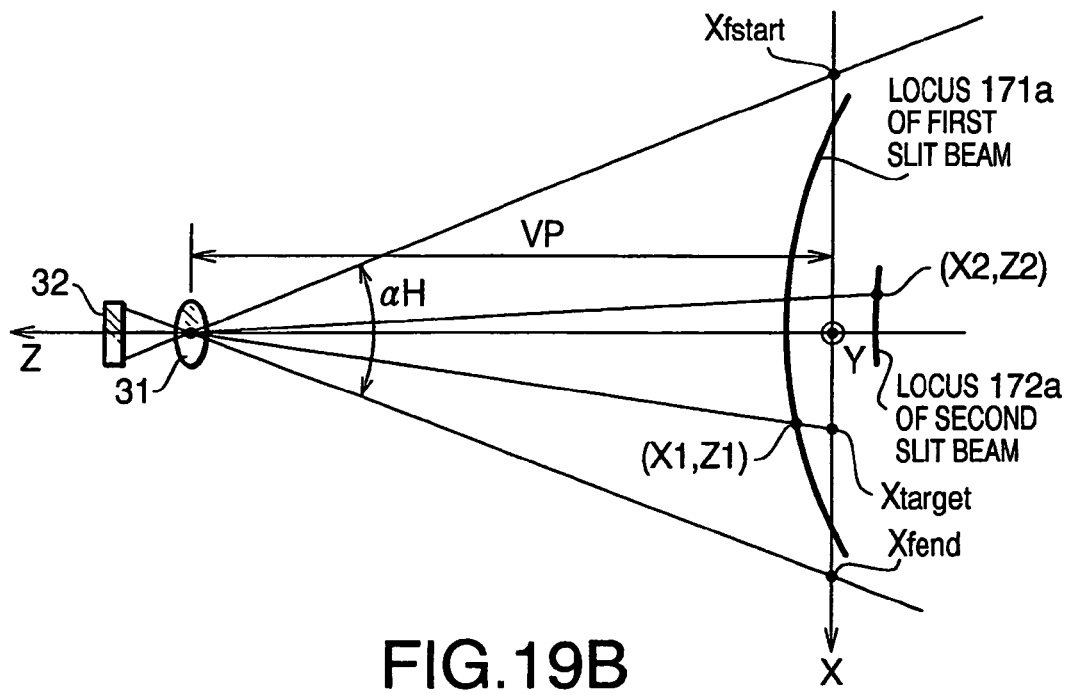
FIG. 19B is a schematic diagram showing an X-Z plane, for explaining the method for calculating the three-dimensional spatial position.

Here, a coordinate system of the image capturing device 201 with respect to the document P (curved in the crosswise direction) being shot as shown in FIG. 18A is defined as follows. As shown in FIGS. 19A and 19B, the optical axis direction of the imaging lens 31 is defined as a Z-axis. A position that is a reference distance VP away from the image capturing device 201 is defined as the origin of X, Y and Z-axes. A horizontal direction and a vertical direction with respect to the image capturing device 201 are defined as the X-axis and the Y-axis, respectively.

The number of pixels of the CCD image sensor 32 in the X-axis direction will be called "ResX" and that in the Y-axis direction will be called "ResY". The upper end, lower end, left end and right end of the CCD image sensor 32 projected on the X-Y plane through the imaging lens 31 will be called "Yftop", "Yfbottom", "Xfstart" and "Xfend". The distance from the optical axis of the imaging lens 31 to the optical axis of the first slit beam 171 emitted from the slit beam projection unit 120 is assumed to be "D". The position of an intersection point of the first slit beam 171 and the X-Y plane measured in the Y-axis direction will be called "las1". The position of an intersection point of the second slit beam 172 and the X-Y plane measured in the Y-axis direction will be called "las2".

Under the above definitions, a three-dimensional spatial position (X1, Y1, Z1) corresponding to coordinates (ccdx1, ccdy1) of an attention point 1 (when a pixel of the image of the locus 171*a* of the first slit beam is paid attention to) on the CCD image sensor 32 is figured out from solutions of the following five simultaneous equations regarding triangles formed by the point on the imaging surface of the CCD image sensor 32, the emission point of the first and second slit beams 171 and 172, and intersection points with the X-Y plane.

$$Y1 = -((las1+D)/VP)Z1 + las1 \quad (1)$$

$$Y1 = -(Ytarget/VP)Z1 + Ytarget \quad (2)$$

$$X1 = -(Xtarget/VP)Z1 + Xtarget \quad (3)$$

$$Xtarget = Xfstart + (ccdx1/ResX) \times (Xfend - Xfstart) \quad (4)$$

$$Ytarget = Yftop - (ccdy1/ResY) \times (Yftop - Yfbottom) \quad (5)$$

Incidentally, las1=−D and thus Y1=−D in this embodiment since the first slit beam 171 is parallel to the Z-axis.

Similarly, a three-dimensional spatial position (X2, Y2, Z2) corresponding to coordinates (ccdx2, ccdy2) of an attention point 2 (when a pixel of the image of the locus 172*a* of the second slit beam is paid attention to) on the CCD image sensor 32 is figured out from solutions of the following five simultaneous equations.

$$Y2 = -((las2+D)/VP)Z2 + las2 \quad (1)$$

$$Y2 = -(Ytarget/VP)Z2 + Ytarget \quad (2)$$

$$X2 = -(Xtarget/VP)Z2 + Xtarget \quad (3)$$

$$Xtarget = Xfstart + (ccdx2/ResX) \times (Xfend - Xfstart) \quad (4)$$

$$Ytarget = Yftop - (ccdy2/ResY) \times (Yftop - Yfbottom) \quad (5)$$

Figure 20A:
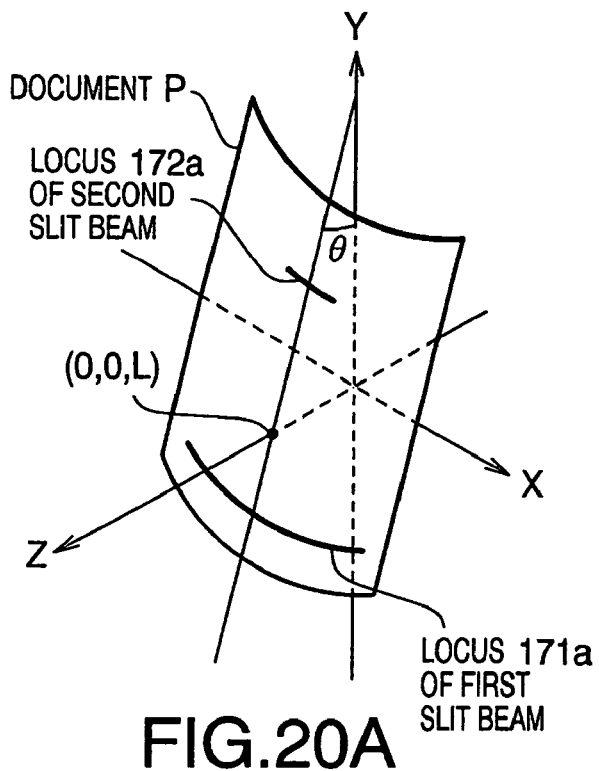
FIG. 20A shows a coordinate system used for document attitude calculation while indicating a document which has been leaned.

A concrete process of the step S2160 executed by the document attitude calculation program 424 is as follows, for example. A curve is obtained by executing regression curve approximation to points at the three-dimensional spatial positions corresponding to the locus 171*a* of the first slit beam based on the data stored in the triangulation calculation result storage unit 434, and a straight line connecting a point on the curve where the position in the X-axis direction is "0" and a three-dimensional spatial position on the locus 172*a* of the second slit beam where the position in the X-axis direction is "0" is assumed. Subsequently, an intersection point of the assumed straight line and the Z-axis (i.e. an intersection point of the optical axis and the document P) is obtained as a three-dimensional spatial position (0, 0, L) of the document P (see FIG. 20A). The angle of the straight line with respect to the X-Y plane is obtained as a lean θ of the document P around the X-axis.

Figure 20B:
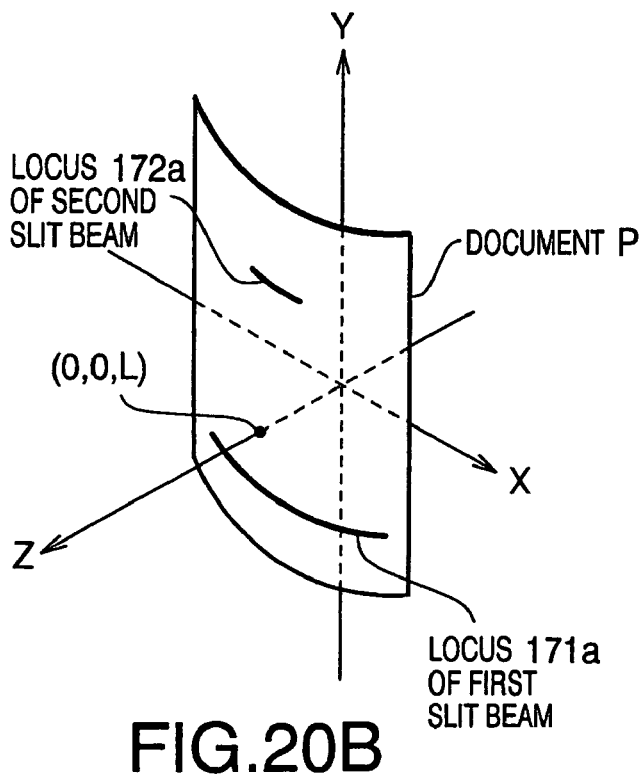
FIG. 20B shows the coordinate system used for the document attitude calculation while indicating the document placed in parallel with an X-Y plane.
Figure 20C:
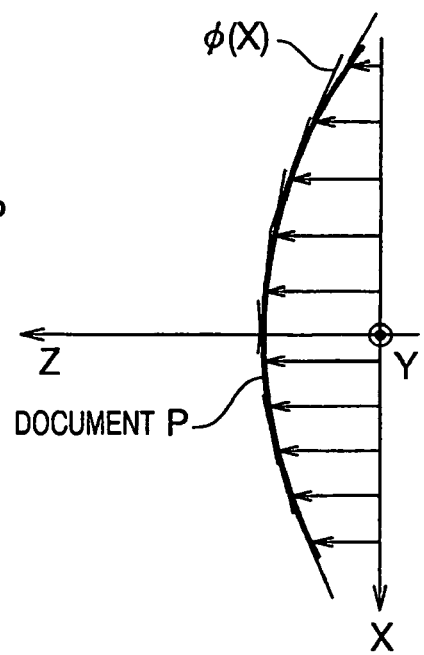
FIG. 20C shows the coordinate system used for the document attitude calculation while indicating curvature of the document.

Further, as shown in FIG. 20B, a state in which the curve obtained by the regression curve approximation of the locus 171*a* of the first slit beam is rotated by −θ (θ: the lean of the document P around the X-axis obtained above), that is, a state in which the document P is placed in parallel with the X-Y plane, is assumed. Subsequently, a cross section of the document P on the X-Z plane is considered as shown in FIG. 20C.

In the sectional form of the document P in the X-axis direction, displacements of the cross section in the Z-axis direction are obtained for a plurality of positions in the X-axis direction. Based on the displacements, curvature φ(X) indicating the gradient with respect to the X-axis direction is obtained as a function of the position X in the X-axis direction.

Figure 21:
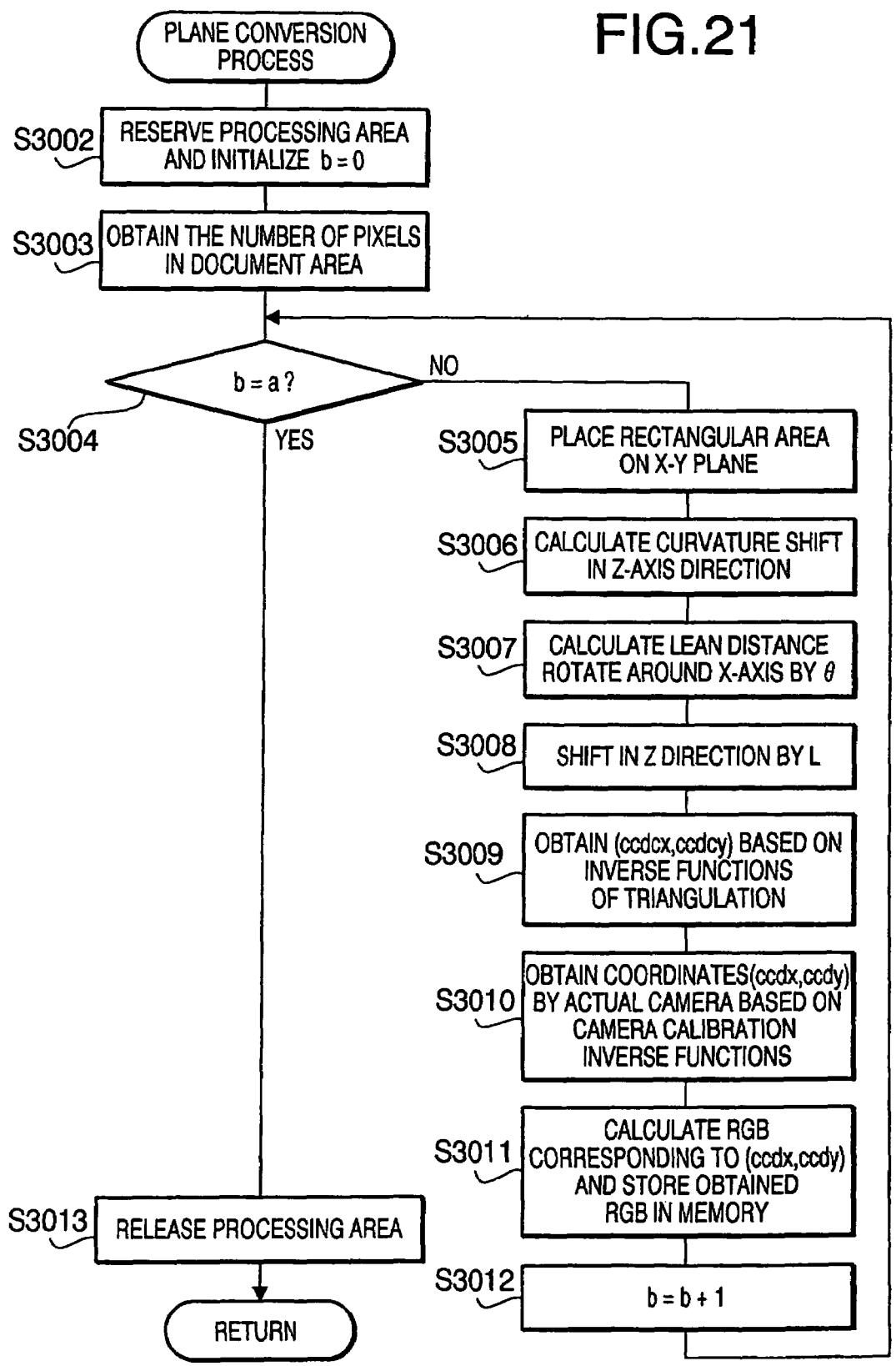
FIG. 21 is a flow chart showing a process executed by a plane conversion program in accordance with the second embodiment.

The step S2170 is executed by the plane conversion program 425 according to a process shown in a flow chart of FIG. 21, for example. The process of FIG. 21 will be explained below.

First, a processing area for this process is reserved in the working area 436 of the RAM 43 and initial values of variables used in this process (e.g. variables for counters) are set (S3002).

Subsequently, an area of an erect image (an image of a surface of the document P on which characters, etc. are drawn or printed, viewed substantially in the vertical direction) is set by transforming points at the four corners of the slit-beamless image based on the three-dimensional spatial position (0, 0, L) of the document P, the lean θ around the X-axis and the curvature φ(X) which have been obtained by the calculations by the document attitude calculation program 425, and the number "a" of pixels contained in the area is obtained (S3003).

Subsequently, the area of the erect image set as above is first placed on the X-Y plane (S3005). The three-dimensional spatial position of each pixel contained in the area is shifted in the Z-axis direction based on the curvature φ(X) (S3006), rotated around the X-axis by the lean θ (S3007), and shifted in the Z-axis direction by the distance L (S3008). The obtained three-dimensional spatial position is converted into coordinates (ccdcx, ccdcy) on a CCD image captured by an ideal camera according to the aforementioned relational expressions of triangulation (S3009). Further, the coordinates (ccdcx, ccdcy) are converted into coordinates (ccdx, ccdy) on a CCD image captured by the actual camera by means of a well-known calibration technique based on aberration characteristics of the imaging lens 31 being used (S3010). Subsequently, the state of a pixel of the slit-beamless image at the position of the converted coordinates is obtained and stored in the working area 436 of the RAM 43 (S3011). The above process is repeated for the number "a" of pixels (S3012, S3004), by which image data of the erect image is generated.

As above, the image capturing device 201 projects two slit beams (the first and second slit beams 171 and 172) onto the document P and captures an image of the document P by letting the imaging lens 31 form the image on the CCD image sensor 32. Thereafter, another image of the document P with no slit beam projected thereon is captured. A locus image of the slit beams is extracted from the image data by calculating the difference between the two pieces of image data, and the three-dimensional spatial position of each part of the loci of the slit beams is calculated according to the triangulation principle. The position, the lean and the curvature state of the document P are obtained from the obtained three-dimensional spatial positions, and the three-dimensional shape of the document P is estimated while regarding the shape of the locus 171a of the first slit beam as a cross-sectional form of the whole document P. Based on the result of the estimation, image data which has been corrected as if a flat document P were shot from its front is generated. The generated image data is recorded in the card memory 55.

Therefore, the user of the image capturing device 201 is allowed to store image data, that has been corrected as if a flat document P were shot from its front, in the card memory 55 even when the user is shooting a deformed (e.g. curved) document P from an oblique direction. In other words, the user can obtain an image corrected as if a flat document P were shot from its front, only by performing an ordinary shooting operation (switching the mode selection switch 59 to the "corrective imaging mode", checking through the finder 53 or the LCD 51 whether a desired range of the document P has been fit in the shooting frame, and shooting the image by pressing the release button 52).

The image data stored in the card memory 55 can be used in various ways, such as checking the results of shooting by letting the LCD 51 display the images stored in the card memory 55, removing the card memory 55 from the image capturing device 201 to an external personal computer to let the PC display or print the image data, etc.

When the specifications of the slit beam projection unit 120 are as explained above, the power of the second slit beam 172 relative to the total power outputted by the laser diode 21 is as small as approximately 5% while the power of the first slit beam 171 split by the transparent flat plate 124 is 95%. However, the power of the first slit beam 171 (spread angle: 48 degrees) per unit angle (approximately 20 μW/degree) is substantially equal to that (approximately 21 μW/degree) of the second slit beam 172 (spread angle: 2.4 degrees). When the document P is white paper that is placed the reference distance VP (330 mm) away from the slit beam projection unit 120, the illumination intensity achieved by the first and second slit beams 171 and 172 is approximately 1260 lux, by which a sufficient difference in luminance can be secured between the document P and the loci of the slit beams even in places where the illumination intensity is 500-1000 lux (average room illumination). Therefore, the locus image of the slit beams can be extracted successfully by the difference extraction program 422.

As explained above, the image capturing device 201 is capable of outputting two slit beams with power per unit angular width equivalent to that in cases where only one slit beam is projected onto the subject, without the need of increasing the output power of the laser diode 21. With such a configuration, the three-dimensional shape of a subject can be detected successfully with a simple and compact configuration of the image capturing device 201.

Figure 22A:
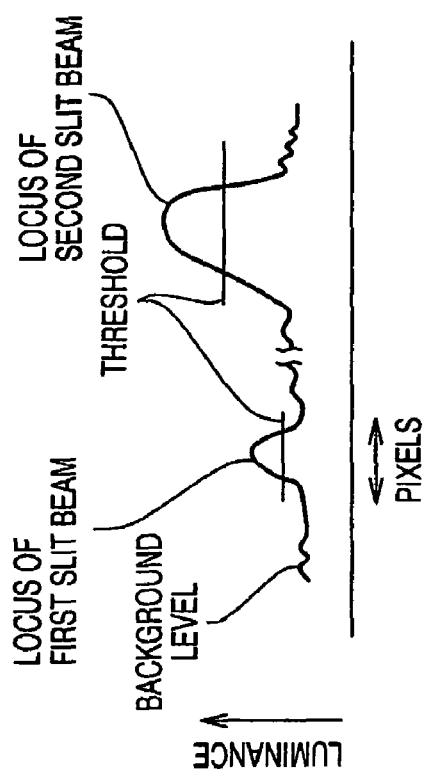
FIG. 22A is a schematic diagram for explaining a method for recognizing peaks of loci of the slit beams in accordance with the second embodiment.
Figure 22B:
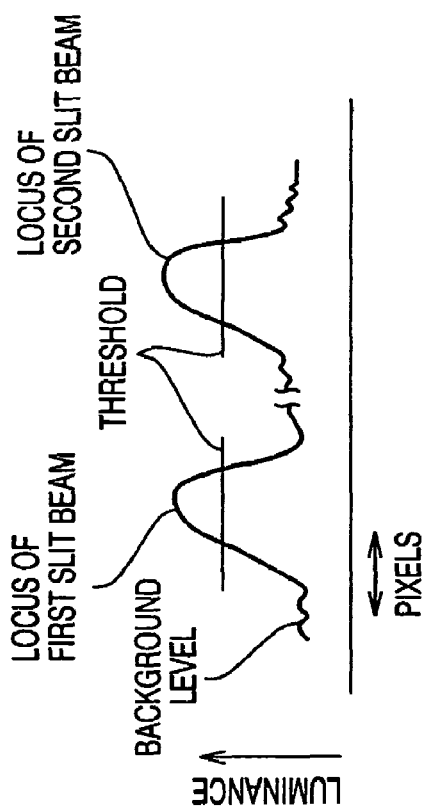
FIG. 22B is a schematic diagram showing a case where the slit beams have different peaks, as a comparative example against FIG. 22A.

Since the power of the first slit beam 171 per unit angle is substantially equal to that of the second slit beam 172 in this embodiment, the signal level of the CCD image sensor 32 corresponding to the locus 171a of the first slit beam and that corresponding to the locus 172a of the second slit beam represent substantially the same luminance. For example, in FIG. 22A showing signals from pixels of the CCD image sensor 32 arranged in a lengthwise direction, signal levels of pixels capturing the locus 171a of the first slit beam relative to the background level is substantially equal to that of pixels capturing the locus 172a of the second slit beam, by which the difference extraction program 422 is allowed to use a common threshold value for the extraction of the loci of the slit beams. Incidentally, if there is a difference in power per unit angle between the first and second slit beams 171 and 172, a peak value might be buried in fluctuating background levels and the precise detection of the loci of the slit beams might become impossible unless separate threshold values are used for the first and second slit beams 171 and 172 as shown in FIG. 22B. Such separate setting of threshold values for the detection of the loci of the slit beams for each point of detection depending on the background noise causes an increased number of calculations and inefficiency. Such problems are eliminated by this embodiment.

Further, the AR coat on the back of the transparent flat plate 24 reduces reflection when the laser beam entering the transparent flat plate 24 emerges therefrom, by which loss of the laser beam inside the transparent flat plate 24 is reduced.

By setting the ratio of the laser beam reflected by the transparent flat plate 124 at a surface reflectance 5% which is determined by the refractive index of the material of the transparent flat plate 124, the manufacturing step of forming a vapor-deposited metal film on the reflecting surface (necessary when the component is implemented by an ordinary half mirror) can be left out.

In regard to a three-dimensional shape detecting device as an embodiment of the present invention, the laser diode 21 corresponds to a "light source" in "light output means,", and the transparent flat plate 24 corresponds to "splitting means" in the light output means. The slit beam projection unit 120 corresponds to "pattern beam projection means", the imaging lens 31 and the CCD image sensor 32 correspond to "projected image capturing means", and the steps S140-S160 executed by the processor 40 correspond to "three-dimensional shape calculation means".

In regard to an image capturing device in accordance with the present invention, the imaging lens 31 and the CCD image sensor 32 correspond to "image capturing means", the step S170 executed by the processor 40 corresponds to "image correction means", and the RAM 43 corresponds to "storage means".

While a description has been given above of embodiments in accordance with the present invention, the present invention is not to be restricted by the particular illustrative embodiments but can be implemented in various other configurations. In the following, several modifications in regard to the second embodiment will be described.

For example, the subject being shot by the image capturing device 201 is not restricted to a sheet-like document P but can also be a smooth surface of a solid block or, depending on the situation, a surface of an object having ridge lines. Therefore, the image capturing device 201 is capable of achieving the effect of detecting the three-dimensional shape of a subject almost equally for any purpose seeking to figure out a three-dimensional shape in a three-dimensional space based on loci of two slit beams.

However, if the subject is a sheet-like document P as in this embodiment, it is possible to estimate the shape of the whole document P by regarding the locus 171a of the first slit beam as a sectional form of the document P and thereby carry out the image correction in regard to deformation (e.g. curvature) of the document P. Further, when the subject has a three-dimensional shape substantially uniform in a direction orthogonal to the longitudinal direction of the slit beams, it is unnecessary to consider a shift in the detecting attitude due to peculiar shapes (protrusions, etc.) of parts of the subject onto which the slit beams are projected, by which the user is relieved of the need of being careful about the parts onto which the slit beams are projected.

Figure 18B:
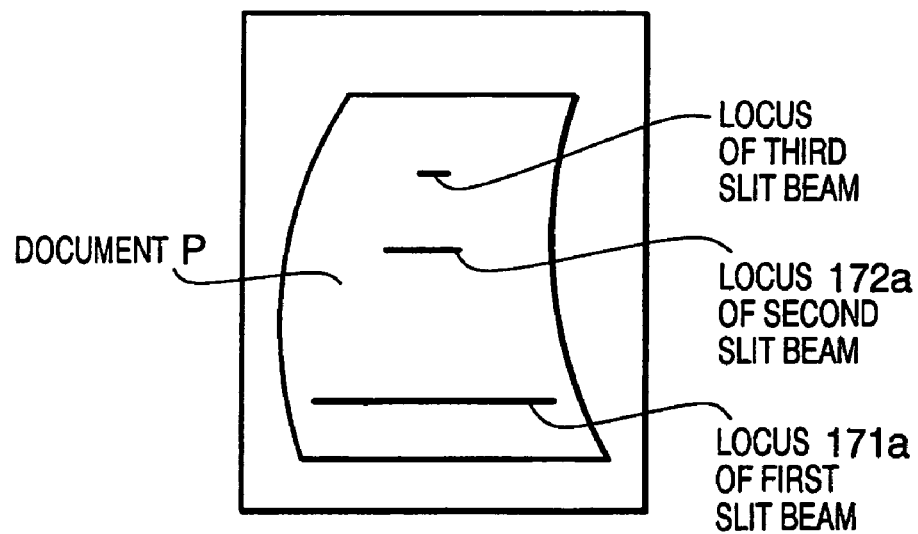
FIG. 18B is a schematic diagram showing an example in which three slit beams are projected onto a document.

While the slit beam projection unit 120 is configured to output two slit beams (the first and second slit beams 171 and 172) in the image capturing device 201 of this embodiment, the slit beam projection unit 120 may also be configured to output three or more slit beams. For example, the slit beam projection unit 120 may be configured so that a third slit beam (in addition to the first and second slit beams 171 and 172) similar to the second slit beam 172 will be projected onto a part of the document P above the second slit beam 172 as depicted in FIG. 18B showing a locus image of the slit beams projected onto the document P. With such a configuration, a curved shape of the document P in its lengthwise direction can also be estimated based on the positions of points on the loci of the first through third slit beams. In this case, an image still easier to see can be generated by the correction of the slit-beamless image.

While the laser diode 21 emitting a red laser beam is used as the light source in this embodiment, various devices capable of emitting an optical beam (plane emission laser, LED, EL device, etc.) can be employed as the light source.

While the transparent flat plate 124 reflecting a prescribed ratio of the incident beam is used as the splitting means in this embodiment, a function equivalent to the transparent flat plate 124 can be implemented by a transparent flat plate having a surface provided with a diffraction grating diffracting the prescribed ratio of the power of the incident laser beam in a particular direction. In this case, a 0th order laser beam passing through the transparent flat plate and a 1st order laser beam diffracted by the diffraction grating can be used as the first and second slit beams 171 and 172, respectively.

Figure 23:
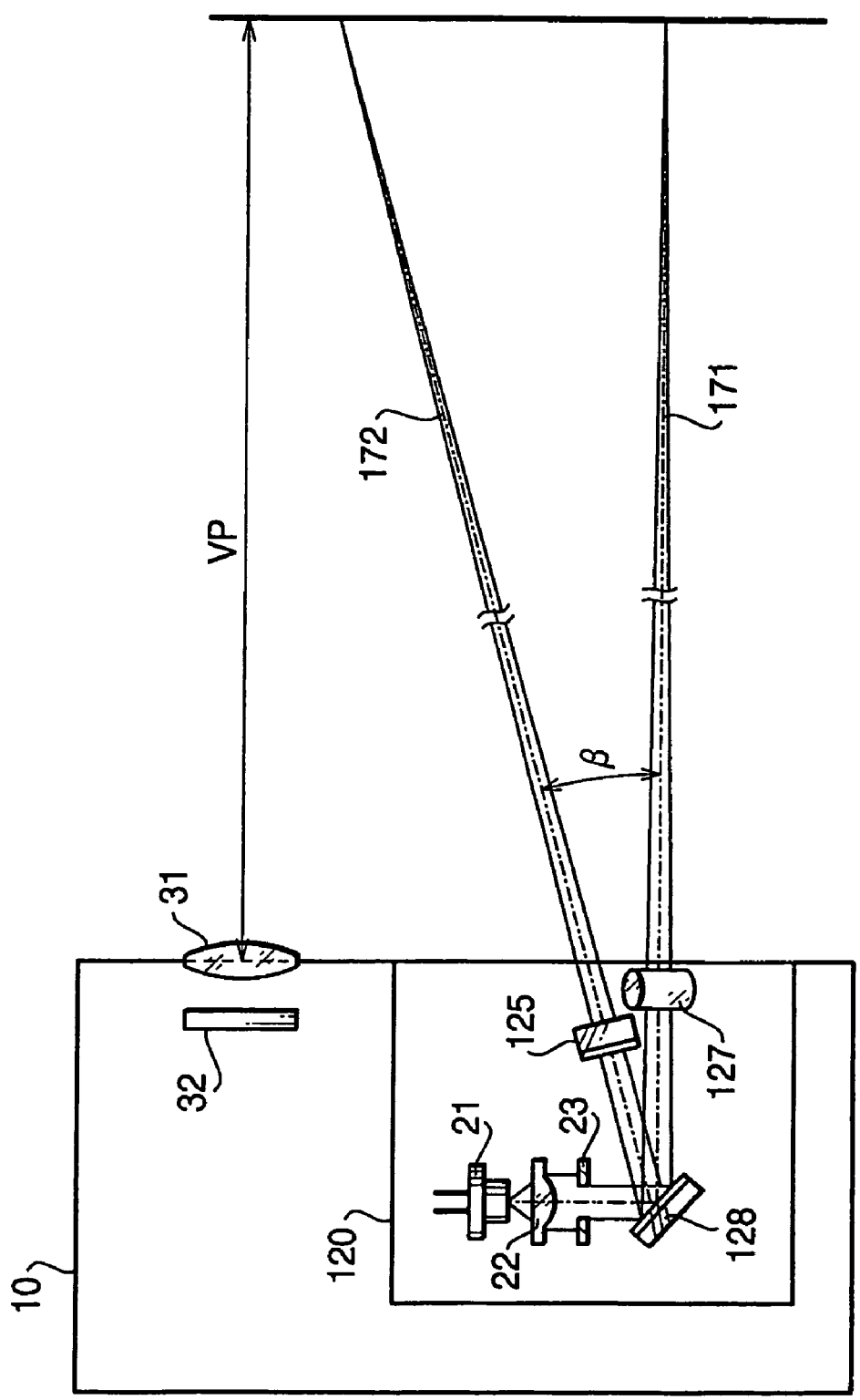
FIG. 23 is a schematic diagram showing a modification of the slit beam projection unit of the second embodiment.

The first and second slit beams 171 and 172 can also be generated by use of a reflective diffraction grating 128 like the one shown in FIG. 23. In this example, the reflective diffraction grating 128 can also serve as the reflecting mirror 26 in the above embodiment. In this case, a 0th order laser beam directly reflected by the reflective diffraction grating 128 and a 1st order laser beam diffracted by the diffraction grating of the reflective diffraction grating 128 can be used as the first and second slit beams 171 and 172, respectively. Such a diffraction grating, in which the power distribution ratio between the 0th order beam and higher order diffracted beams is variable, is suitable for the splitting means.

The shape of each slit beam outputted by the slit beam projection unit 120 is not restricted to a thin line extremely narrowed in a direction orthogonal to its longitudinal direction but can be a stripe-like beam pattern having a certain width.

The positional relationship between the first and second slit beams 171 and 172 may also be inverted. In other words, the optical elements may be arranged so that the second slit beam 172 will be oriented in the first direction (below the first slit beam 171 when viewed from the image capturing device 201) and the first slit beam 171 will be oriented in the second direction.

While the image capturing device 201 is configured to capture the slit-beamed image and the slit-beamless image by use of the imaging lens 31 and the CCD image sensor 32, the image capturing device 201 may be provided with extra imaging lens and CCD image sensor for capturing the slit-beamed image in addition to the imaging lens 31 and the CCD image sensor 32. With such a configuration, the time lag between the capturing of the slit-beamed image and the capturing of the slit-beamless image (time for the transfer of image data from the CCD image sensor 32, etc.) can be eliminated. In this case, deviation in the imaging range of the slit-beamless image from that of the slit-beamed image can be eliminated and the three-dimensional shape of the subject can be detected more precisely. However, compared to this example, the image capturing device 201 of this embodiment can realize a reduced size, price, and number of components.

In an embodiment of the present invention, the pattern beam projection means includes light output means which outputs light. The pattern beam projection means transforms the light outputted by the light output means into a beam emitted substantially in a planar shape within a prescribed angular width, deflects part of the beam corresponding to a portion of the prescribed angular width, and thereby forms and outputs a first pattern beam lacking the part of the beam corresponding to the portion of the prescribed angular width due to the deflection and a second pattern beam being deflected with respect to the first pattern beam.

In this three-dimensional shape detecting device, the distance between the position of the pattern beam projection means and the position of the projected image capturing means is fixed and the angle of each slit beam outputted by the pattern beam projection means is fixed (known as physical structure). Therefore, the position of each slit beam projected on the subject can be obtained by the three-dimensional shape calculation means by calculating the three-dimensional spatial position of each point on the locus of the slit beam, by determining the angle of a line connecting the projected image capturing means and a particular point at a reflecting position of the pattern beam on the subject (the locus of the slit beam) relative to the optical axis direction of the projected image capturing means based on the image of the subject captured by the projected image capturing means and determining the three-dimensional spatial position of the particular point of the locus of the slit beam by means of the so-called triangulation (determining the shape of a triangle connecting the particular point, the pattern beam projection means and the projected image capturing means by use of the angle). Incidentally, the three-dimensional shape of the missing part of the locus of the first pattern beam can be estimated from an approximated curve of the locus other than the missing part.

Since the loci of the first and second pattern beams are formed on the same plane surface of the subject, assuming that the subject has a three-dimensional shape substantially uniform in a direction orthogonal to the longitudinal direction of the pattern beam, the three-dimensional shape calculation means can estimate the three-dimensional shape of the subject by spreading the shape of the locus of the first pattern beam (obtained from the three-dimensional spatial positions) toward the locus of the second pattern beam.

With the three-dimensional shape detecting device configured as above, the three-dimensional shape of a subject can be detected without making contact with the subject. Since the first and second pattern beams are formed by deflecting part of a pattern beam transformed from the optical beam, the power of the first and second pattern beams per unit angular width can be made equal to that in cases where only one pattern beam (slit beam) is outputted, by which the loci of the slit beams can be recognized reliably even when two slit beams are used, without the need of increasing the total emission power of the light source unit as in the conventional three-dimensional shape detecting device.

In an embodiment of the present invention, the pattern beam projection means may be configured to output the first pattern beam by reflecting the beam with a first reflecting surface which reflects the beam in a prescribed direction, while outputting the second pattern beam by reflecting the beam with a second reflecting surface which is tilted with respect to the first reflecting surface to reflect the beam in a direction a prescribed angle tilted from an optical path direction of the first pattern beam.

With the three-dimensional shape detecting device configured as above, the formation of the first and second pattern beams from the pattern beam transformed from the optical beam can be implemented by two mirrors, for example, by which a simpler configuration and lower price of the device can be realized compared to cases where a beam splitting device like a prism or a diffraction grating is used.

Incidentally, in the case where the three-dimensional shape calculation means determines the three-dimensional shape of the subject by use of the pattern beam having a missing part and by interpolating the missing part, the accuracy of the interpolation increases when both edges of the first pattern beam are projected on the subject and data of the missing part is interpolated based on the image of the locus of the pattern beam. Therefore, in an embodiment of the present invention, the part that the first pattern beam outputted by the pattern beam projection means lacks due to the deflection may be configured to include no edge part of the beam.

With the above configuration, the angular width of the first pattern beam remains as wide as that of the pattern beam transformed from the optical beam, without being narrowed (with no edge part of the pattern beam missing) for the formation of the second pattern beam, by which the first pattern beam having the angular width as wide as possible can be projected on the subject.

A locus of a pattern beam (reflected light) captured by the projected image capturing means can be caused by diffused light diff-used by the subject or regular reflection light regularly reflected by the subject as shown in FIG. 11A. The luminance of an image of a locus of a slit beam caused by regular reflection light is far higher than that of an image of a locus of a pattern beam caused by diffused light. Especially when the pattern beam projection means and the projected image capturing means are arranged in a direction substantially orthogonal to the plane of a pattern beam, a central part of the pattern beam outputted by the pattern beam projection means tends to enter the projected image capturing means as regular reflection light.

In cases where photoelectric transducers like CCDs are used for the projected image capturing means to capture images, when a part having extremely high luminance is captured by the projected image capturing means, an excessively strong signal is inputted to a CCD and a leak of light toward surrounding CCDs is caused. Consequently, signals of pixels arranged in the crosswise direction or lengthwise direction can change together during image signal processing, causing a phenomenon called "smear" (a stripe of light in an image as shown in FIG. 11B). With such a smear, the recognition of the loci of the slit beams and the determination of the three-dimensional shape might become incorrect.

Thus, in order to reduce the probability of smears in the image of the loci of the slit beams, the three-dimensional shape detecting device may be configured as below. In an embodiment of the present invention, the first pattern beam outputted, by the pattern beam projection means is formed to lack a part corresponding to a substantially central portion of the prescribed angular width.

With the above configuration, the first pattern beam lacks the part corresponding to the substantially central portion of the prescribed angular width (likely to cause regular reflection light), by which the probability of entrance of regular reflection light into the projected image capturing means is reduced and the smears can be prevented.

In an embodiment of the present invention, the three-dimensional shape detecting device may be used for detecting the three-dimensional shape of a subject having a three-dimensional shape substantially uniform in a direction crossing the direction of projection of the pattern beams.

With the above configuration, the three-dimensional shape of the subject onto which the pattern beams are projected (a subject having a three-dimensional shape substantially uniform in a direction crossing the direction of projection of the pattern beams) can be determined by estimating the shape of part or all of the subject by assuming that parts of the subject above and below the locus of a pattern beam are in the same shape as the locus of the pattern beam, for example.

If the subject has a three-dimensional shape substantially uniform in a direction orthogonal to the direction of the pattern beams, it is unnecessary to consider an error, etc. occurring to the detected three-dimensional shape due to peculiar shapes (protrusions, etc.) of parts of the subject onto which the pattern beams are projected, by which the user is relieved of the need of being careful about the parts onto which the pattern beams are projected.

In an embodiment of the present invention, the subject having a three-dimensional shape substantially uniform in a direction crossing the direction of projection of the pattern beams may be a sheet-like object.

In an embodiment of the present invention, the pattern beam projection means includes light output means which outputs a plurality of optical beams. The pattern beam projection means transforms the optical beams into the pattern beams. The pattern beams at least include a long pattern beam having a prescribed angular width and a short pattern beam having a narrower angular width relative to the long pattern beam.

In the three-dimensional shape detecting device configured as above, the distance between the position of the pattern beam projection means and the position of the projected image capturing means is fixed and the angle of each pattern beam outputted by the pattern beam projection means is fixed (known as physical structure). The three-dimensional shape calculation means determines the angle of a line connecting the projected image capturing means and a particular point at a reflecting position of the pattern beam on the subject (the locus of the pattern beam) relative to the optical axis direction of the projected image capturing means based on the image of the subject captured by the projected image capturing means. Subsequently, the three-dimensional shape calculation means determines the three-dimensional spatial position of the particular point of the locus of the pattern beam by means of the so-called triangulation (determining the shape of a triangle connecting the particular point, the pattern beam projection means and the projected image capturing means by use of the angle). By determining the three-dimensional spatial position of each point on the locus of each pattern beam, the position of each pattern beam projected on the subject can be determined.

Assuming that the subject has a three-dimensional shape substantially uniform in a direction orthogonal to the longitudinal direction of the long pattern beam, the three-dimensional shape of the subject can be determined by estimating the three-dimensional shape assuming that the shape of the locus of the long pattern beam directly spreads toward the locus of the short pattern beam.

Consequently, with the three-dimensional shape detecting device configured as above, the three-dimensional shape of a subject can be detected without making contact with the subject. Further, total emission power of the three-dimensional shape detecting device, projecting the long pattern beam and the short pattern beam onto the subject, can be reduced compared to devices projecting two long pattern beams since the total length of the pattern beams can be reduced.

In an embodiment of the present invention, the light output means may be configured to output the optical beam to be transformed into the short pattern beam with lower power compared to the optical beam to be transformed into the long pattern beam.

With the above configuration, a three-dimensional shape detecting device efficiently distributing the total optical beam emission power to the pattern beams can be realized by the reduction of the power of the short pattern beam.

In an embodiment of the present invention, power ratio among the optical beams outputted by the light output means may be set substantially equal to angular width ratio among the pattern beams transformed from the optical beams by the pattern beam projection means.

With the above configuration, the power of the long pattern beam per unit angular width equals that of the short pattern beam and thus the luminance of the locus of the long pattern beam on the subject becomes substantially equal to that of the locus of the short pattern beam. Therefore, the three-dimensional shape calculation means is allowed to use a common reference value for the recognition of the loci of the long pattern beam and the short pattern beam, by which the loci of the pattern beams can be recognized precisely and efficiently.

The pattern beam projection means may employ various methods for transforming an optical beam into a pattern beam, such as a method forming a slit beam by uniformly diff-using an optical beam on a prescribed surface and letting the diffused beam pass through a slit of a prescribed size, a method forming a slit beam by projecting an optical beam onto a revolving polygon mirror and letting the polygon mirror scan the optical beam, etc.

In an embodiment of the present invention, the pattern beam projection means may be configured to transform the optical beams into the pattern beams by use of cylindrical lenses having focal lengths corresponding to the angular widths of the pattern beams transformed from the optical beams.

With the above configuration, the pattern beam projection means can be implemented in a small size and a simplified configuration, with small power loss of the light source. In the aforementioned method forming a slit beam via a slit, most of the optical beam can not pass through the slit, resulting in a heavy energy loss of the optical beam. The method scanning the optical beam with a revolving polygon mirror requires a mechanism for driving the polygon mirror, resulting in a complex configuration of the device and difficulty of downsizing. On the other hand, with the method employing cylindrical lenses, the power loss of the optical beams is small, the device configuration is simple with no driving mechanism, and the downsizing of the device is easy.

While the light output means may be provided with a plurality of light sources so as to output a plurality of optical beams of different power corresponding to the angular widths of the pattern beams transformed from the optical beams, such a device is necessitated to be large and expensive with a large number and wide variety of light sources.

Therefore, in an embodiment of the present invention, the light output means may be implemented by a light source which generates an optical beam and splitting means which splits the optical beam from the light source and thereby outputs a plurality of optical beams.

With the above configuration, the light output means can be implemented by the minimum number of light sources, by which a small size and low price of the three-dimensional shape detecting device can be realized. Incidentally, in this configuration in which the total emission power of the optical beams from the light output means is reduced by reducing the power of the optical beam to be transformed into the short pattern beam, the output power of the light source tends to be kept low, which is suitable for the formation employing only one light source.

In an embodiment of the present invention, the splitting means may be configured to split the optical beam with a virtually transparent flat plate provided with antireflection processing at least on one side.

With the above configuration, the optical beam can be split by the virtually transparent flat plate into an optical beam reflected by the virtually transparent flat plate and an optical beam penetrating the virtually transparent flat plate. The power distribution ratio between the optical beams can be adjusted by changing the reflectance of the virtually transparent flat plate. Further, loss of the optical beam penetrating the virtually transparent flat plate caused by reflection is reduced thanks to the antireflection processing. Furthermore, the virtually transparent flat plate is lighter than other beam splitting devices like a prism. Therefore, by use of the virtually transparent flat plate, splitting means that is compact, lightweight and low-priced can be realized.

In an embodiment of the present invention, the three-dimensional shape detecting device may be used for detecting the three-dimensional shape of a subject having a three-dimensional shape substantially uniform in a direction crossing the direction of projection of the long pattern beam.

With the above configuration, the part of the subject onto which the pattern beam is projected can be assumed to have a three-dimensional shape substantially uniform in a direction crossing the direction of projection of the pattern beam, and the shape of part or all of the subject can be estimated by assuming that parts of the subject above and below the locus of the pattern beam are in the same shape as the three-dimensional shape corresponding to the locus of the pattern beam, for example.

If the subject has a three-dimensional shape substantially uniform in a direction crossing the direction of projection of a pattern beam, it is unnecessary to consider an error, etc. occurring to the detected three-dimensional shape due to a peculiar shape (protrusion, etc.) of a part of the subject onto which the pattern beam is projected, by which the user is relieved of the need of being careful about the part onto which the pattern beam is projected.

In an embodiment of the present invention, the subject having a three-dimensional shape substantially uniform in a direction crossing the direction of projection of the long pattern beam may be a sheet-like object.

In an image capturing device as an embodiment of the present invention, the pattern beam projection means includes light output means which outputs light. The pattern beam projection means transforms the light outputted by the light output means into a beam emitted substantially in a planar shape within a prescribed angular width, deflects part of the beam corresponding to a portion of the prescribed angular width, and thereby forms and outputs a first pattern beam lacking the part of the beam corresponding to the portion of the prescribed angular width due to the deflection and a second pattern beam being deflected with respect to the first pattern beam.

In an image capturing device as an embodiment of the present invention, the pattern beam projection means includes light output means which outputs a plurality of optical beams. The pattern beam projection means transforms the optical beams into the pattern beams. The pattern beams at least include a long pattern beam having a prescribed angular width and a short pattern beam having a narrower angular width relative to the long pattern beam.

In an embodiment of the present invention, the image capturing means, the storage means, the three-dimensional shape obtaining means and the image correction means may be installed in a body case of the image capturing device.

While the above embodiments have been described for the purpose of illustration, the present invention is not to be restricted by the contents of the above embodiments but should be appreciated based on the description of the appended claims.

What is claimed is:

1. A three-dimensional shape detecting device comprising:
   a pattern beam projection unit which outputs an optical beam, condenses the optical beam, and transforms the optical beam so as to project a plurality of pattern beams including two pattern slit beams having different angular widths, the pattern beam projection unit including a light output unit which outputs light, the pattern beam projection unit transforming the light outputted by the light output unit into a beam emitted substantially in a planar share within a prescribed angular width, deflecting part of the beam corresponding to a portion of the prescribed angular width, and thereby forming and outputting a first pattern beam lacking the part of the beam corresponding to the portion of the prescribed angular width due to the deflection and a second pattern beam being deflected with respect to the first pattern beam;
   an image capturing unit which captures an image of a subject onto which the pattern beams are projected, from a position a prescribed distance apart from the pattern beam projection unit; and
   a three-dimensional shape calculation unit which calculates positions of the pattern beams projected on the subject based on the image captured by the image capturing unit and thereby determines a three-dimensional shape of the subject.

2. The three-dimensional shape detecting device according to claim 1, wherein the pattern beam projection unit outputs the first pattern beam by reflecting the beam with a first reflecting surface which reflects the beam in a prescribed direction, while outputting the second pattern beam by reflecting the beam with a second reflecting surface which is tilted with respect to the first reflecting surface to reflect the beam in a direction a prescribed angle tilted from an optical path direction of the first pattern beam.

3. The three-dimensional shape detecting device according to claim 1, wherein the part that the first pattern beam outputted by the pattern beam projection unit lacks due to the deflection includes no edge part of the beam.

4. The three-dimensional shape detecting device according to claim 1, wherein the first pattern beam outputted by the pattern beam projection unit is formed to lack a part corresponding to a substantially central portion of the prescribed angular width.

5. The three-dimensional shape detecting device according to claim 1, wherein the three-dimensional shape detecting device is used for detecting the three-dimensional shape of a subject having a three-dimensional shape substantially uniform in a direction crossing the direction of projection of the pattern beams.

6. The three-dimensional shape detecting device according to claim 5, wherein the subject having a three-dimensional shape substantially uniform in a direction crossing the direction of projection of the pattern beams is a sheet-like object.

7. The three-dimensional shape detecting device according to claim 1, wherein:
   the pattern beam projection unit includes a light output unit which outputs a plurality of optical beams;
   the pattern beam projection unit transforms the optical beams into the pattern beams; and
   the pattern beams at least include a long pattern beam having a prescribed angular width and a short pattern beam having a narrower angular width relative to the long pattern beam.

8. The three-dimensional shape detecting device according to claim 7, wherein the light output unit outputs the optical beam to be transformed into the short pattern beam with lower power compared to the optical beam to be transformed into the long pattern beam.

9. The three-dimensional shape detecting device according to claim 7, wherein power ratio among the optical beams outputted by the light output unit is substantially equal to angular width ratio among the pattern beams transformed from the optical beams by the pattern beam projection unit.

10. The three-dimensional shape detecting device according to claim 7, wherein the pattern beam projection unit transforms the optical beams into the pattern beams by use of cylindrical lenses having focal lengths corresponding to the angular widths of the pattern beams transformed from the optical beams.

11. The three-dimensional shape detecting device according to claim 7, wherein the light output unit includes:
   a light source which generates an optical beam; and
   a splitting unit which splits the optical beam from the light source and thereby outputs a plurality of optical beams.

12. The three-dimensional shape detecting device according to claim 11, wherein the splitting unit is configured to split the optical beam with a virtually transparent flat plate provided with antireflection processing at least on one side.

13. The three-dimensional shape detecting device according to claim 7, wherein the three-dimensional shape detecting device is used for detecting the three-dimensional shape of a subject having a three-dimensional shape substantially uniform in a direction crossing the direction of projection of the long pattern beam.

14. The three-dimensional shape detecting device according to claim 13, wherein the subject having a three-dimensional shape substantially uniform in a direction crossing the direction of projection of the long pattern beam is a sheet-like object.

15. A three-dimensional shape detecting method for detecting a three-dimensional shape of a subject, comprising the steps of:
   outputting an optical beam;
   condensing and transforming the optical beam into a pattern beam as a beam emitted substantially in a planar shape within a prescribed angular width and outputting the pattern beam to be projected onto the subject, the pattern beam including first and second pattern slit beams having different angular widths, the first pattern beam being formed by deflecting part of the beam corresponding to a portion of the prescribed angular width so as to lack the part of the beam corresponding to the portion of the prescribed angular width, and the second pattern beam being deflected with respect to the first pattern beam;
   capturing an image of the subject onto which the pattern beam is projected, from a position a prescribed distance apart from the outputted pattern beam; and
   performing a calculation for determining the three-dimensional shape of the subject by calculating a position of the pattern beam projected on the subject based on the captured image.

16. The three-dimensional shape detecting method according to claim 15, wherein:
   the first pattern beam has a prescribed angular width, and
   the second pattern beam has a narrower angular width relative to the first pattern beam.

17. A three-dimensional shape detecting device comprising:
   a pattern beam projection unit, including a light output unit that outputs a plurality of optical beam, the pattern beam projecting unit condensing the optical beams and transforming the optical beams so as to project a plurality of pattern beams including two pattern slit beams having different angular widths and including a long pattern beam having a prescribed angular width and a short pattern beam having a narrower angular width relative to the long pattern beams;
   an image capturing unit which captures an image of a subject onto which the pattern beams are projected, from a position a prescribed distance apart from the pattern beam projection unit; and
   a three-dimensional shape calculation unit which calculates positions of the pattern beams projected on the subject based on the image captured by the image capturing unit and thereby determines a three-dimensional shape of the subject.

* * * * *